United States Patent
Suzuki et al.

(10) Patent No.: US 6,335,821 B1
(45) Date of Patent: Jan. 1, 2002

(54) OPTICAL FIBER AMPLIFIER AND A METHOD FOR CONTROLLING THE SAME

(75) Inventors: Mikiya Suzuki; Sigeru Shikii, both of Tokyo (JP)

(73) Assignee: Oki Electric Industrial Co. Ltd., Tokyo (JP)

( * ) Notice: Subject to any disclaimer, the term of this patent is extended or adjusted under 35 U.S.C. 154(b) by 0 days.

(21) Appl. No.: 09/501,606

(22) Filed: Feb. 10, 2000

(30) Foreign Application Priority Data

Feb. 10, 1999 (JP) .......................................... 11-032785
Sep. 30, 1999 (JP) .......................................... 11-277868

(51) Int. Cl.$^7$ ............................................. H01S 03/00
(52) U.S. Cl. .............................. 359/337.11; 359/341.4
(58) Field of Search ......................... 359/341.4, 337.11

(56) References Cited

U.S. PATENT DOCUMENTS 6,160,659 A  * 12/2000 Kinoshita ................... 359/337
6,198,572 B1 *  3/2001 Sugaya et al. .............. 359/337
6,215,581 B1 *  4/2001 Yadlowsky ................. 359/337

FOREIGN PATENT DOCUMENTS

| JP | 07193542 | 7/1995 |
| JP | 09153865 | 6/1997 |
| JP | 10335722 A | * 12/1998 |

OTHER PUBLICATIONS

Gain–Flattened Er$^{3+}$—Doped Fiber Amplifier for a WDM Signal in the 1.57–1.60μm Wavelength Region, Hirotaka Ono et al., IEEE Photonics Technology Letters, vol. 9. No. 5, May 1997.
Optical Fiber Amplifier and the Application, Hideki Ishiho (No English abstract).

* cited by examiner

Primary Examiner—Mark Hellner
(74) Attorney, Agent, or Firm—Wenderoth, Lind & Ponack, L.L.P.

(57) ABSTRACT

According to the present invention, an optical fiber amplifier is provided, including: an erbium-doped fiber to which a multiplexed optical signal into which a plurality of optical signals in a long-wavelength band are multiplexed is supplied and which performs amplification in the long-wavelength band; a forward-pumping light source for supplying forward-pumping light to the erbium-doped optical fiber; a backward-pumping light source for supplying backward-pumping light to the erbium-doped optical fiber, the backward-pumping light source having an output power variable based on a control signal; an input-power detector for detecting an input power of the multiplexed optical signal input to the erbium-doped fiber; a temperature detector for detecting a temperature of the erbium-doped fiber; and a control circuit for outputting the control signal based on the input power detected by the input-power detector and the temperature detected by the temperature detector, the control signal changing the output power of the backward-pumping light source to cancel deviation of the amplification of the multiplexed optical signal.

35 Claims, 44 Drawing Sheets

| TEMPERATURE [°C] | T=-30 | | T=0 | | T=25 | | T=40 | | T=80 | |
|---|---|---|---|---|---|---|---|---|---|---|
| Pin [dBm/ch] | Ppump(f) [mW] | Ppump(b) [mW] | Ppump(f) [mW] | Ppump(b) [mW] | Ppump(f) [mW] | Ppump(b) [mW] | Ppump(f) [mW] | Ppump(b) [mW] | Ppump(f) [mW] | Ppump(b) [mW] |
| -15 | 100 | 120 | 100 | 115 | 100 | 75 | 100 | 55 | 100 | 26 |
| -18 | 100 | 119 | 100 | 56 | 100 | 37 | 100 | 26 | 100 | 12 |
| -21 | 100 | 47 | 100 | 27 | 100 | 19 | 100 | 14 | 100 | 7 |
| -24 | 100 | 25 | 100 | 16 | 100 | 11 | 100 | 9 | 100 | 6 |
| -27 | 100 | 18 | 100 | 10 | 100 | 8 | 100 | 7 | 100 | 5 |

*FIG. 22*

| TEMPERATURE [°C] | T=25 | |
|---|---|---|
| Pin [dBm/ch] | Ppump(f) [mW] | Ppump(b) [mW] |
| −15 | 100 | 75 |
| −18 | 100 | 37 |
| −21 | 100 | 19 |
| −24 | 100 | 11 |
| −27 | 100 | 8 |

| TEMPERATURE [°C] | Pin [dBm/ch] | ATT ATTENUATION AMOUNT | WAVELENGTH[nm] | | | | | | | | | GAIN DEVIATION ΔG[dB] |
|---|---|---|---|---|---|---|---|---|---|---|---|---|
| | | | 1573.71 | 1577.03 | 1581.18 | 1584.53 | 1588.73 | 1592.10 | 1596.34 | 1599.75 | |
| 0 | −13 | 16 | 8.65 | 8.27 | 8.20 | 8.57 | 9.22 | 9.37 | 9.00 | 8.27 | 1.17 |
| | −18 | 10 | 10.33 | 9.74 | 9.63 | 9.96 | 10.53 | 10.62 | 10.27 | 9.51 | 1.11 |
| | −23 | 5 | 10.66 | 10.03 | 9.85 | 10.18 | 10.71 | 10.82 | 10.42 | 9.70 | 1.12 |
| 25 | −13 | 14 | 9.71 | 9.25 | 8.84 | 9.13 | 9.57 | 9.74 | 9.42 | 8.74 | 1.00 |
| | −18 | 8 | 10.39 | 9.97 | 9.56 | 9.88 | 10.34 | 10.49 | 10.21 | 9.57 | 0.93 |
| | −23 | 3 | 10.73 | 10.25 | 9.85 | 10.13 | 10.58 | 10.71 | 10.40 | 9.75 | 0.98 |
| 60 | −13 | 10 | 10.10 | 9.86 | 9.31 | 9.73 | 10.16 | 10.33 | 10.10 | 9.51 | 1.02 |
| | −18 | 5 | 10.54 | 10.20 | 9.65 | 10.04 | 10.44 | 10.62 | 10.20 | 9.73 | 0.97 |
| | −23 | 0 | 10.96 | 10.58 | 10.10 | 10.33 | 10.75 | 10.98 | 10.58 | 10.06 | 0.92 |

| TENDENCY OF OUTPUT DEVIATION | λ1−λ2 | REASON | | ATTENUATION AMOUNT OF OPTICAL ATTENUATOR |
|---|---|---|---|---|
| | | POWER OF INPUT SIGNAL LIGHT | ENVIRONMENTAL TEMPERATURE | |
| POWER IN SHORTER WAVELENGTH BAND: HIGH | +(PLUS) | LOW | HIGH | REDUCE |
| POWER IN SHORTER WAVELENGTH BAND: LOW | −(MINUS) | HIGH | LOW | INCREASE |

FIG. 47

OPTICAL FIBER AMPLIFIER AND A METHOD FOR CONTROLLING THE SAME

BACKGROUND OF THE INVENTION

1. Field of the Invention

The present invention relates to an optical amplifier that amplifies an optical signal with a wavelength in a long wavelength region using an erbium-doped fiber.

2. Description of the Related Art

As a known optical amplifier, there is an erbium-doped fiber amplifier (hereinafter, simply referred to as "EDFA") incorporating an erbium-doped fiber (hereinafter, simply referred to as "EDF") having a core doped with an erbium ion $ER^{3+}$, that is one of rare earth elements, for example. In the EDFA, population inversion is formed by directing pumping light into the EDF. When signal light is incident onto the EDF in a state of the population inversion, stimulated emission causes the signal light to be amplified.

In a case of amplifying a plurality of signal light beams using such an optical amplifier, there is a serious problem of gain deviation with wavelength-dependence, i.e., deviation in powers of the amplified signal light beams depending on the wavelengths even if the signal light beams before being amplified have substantially the same power. Hereinafter, the above-mentioned gain deviation is simply referred to as a gain deviation. To suppress the gain deviation is very important in this art.

Recently, in a wavelength-multiplexed transmission system there is a large demand for further enlarging a band in which the amplification occurs. This raises attention to the development of a long-wavelength-band EDFA (hereinafter, referred to as a L-band EDFA) having a gain band approximately at 1580 nm, that is longer than a 1565 nm-band.

FIG. 1 shows the gain deviation of the L-band EDFA when the signal light beams having substantially the same power but having different wavelengths are amplified.

The gain deviation shown in FIG. 1 is accumulated when a plurality of L-band EDFA described above are connected for multiple amplification of the signal light beams, resulting in degradation of a S/N ratio for some wavelengths. In the worst case, at least one of the signal light beams may be eliminated.

There are also various techniques know conventionally for reducing or compensating the gain deviation of the L-band EDFA. The techniques are related to flattening the gain deviation with respect to the change in the input power. However, a change of the gain deviation with respect to the temperature change that is significantly observed in the L-band EDFA has not been precisely understood yet.

In a case of applying the EDFA to an actually-operated system, it is necessary to compensate the characteristics of the EDFA with respect to both the change in the input power and the temperature change.

The change in the input power is considered as making the compensation of the gain deviation difficult in the L-band EDFA, as in that of a C-band EDFA which amplifies a signal light beam in 1550 nm-band. In addition, the temperature-dependency of the EDF itself is also considered as one factor making the compensation of the gain deviation difficult in the L-band EDFA, although it can be ignored in the C-band EDFA. This is because the L-band EDFA has a longer amplification medium than that of the C-band EDFA.

In general, the gain deviation of the L-band EDFA is not uniform with respect to the change in the input power. That is, the gain deviation of the L-band EDFA is varied depending on the change in the input power. This means that the wavelength-dependency of the multi wavelength output signal is varied.

FIGS. 1–6 show the change of the gain deviation of a specific EDFA when the power of the input signal light beam is changed while other conditions are kept the same. FIGS. 2–6 and FIG. 1 show measurement results in cases of the input power Pin of −12 dBm/ch, −15 dBm/ch, −18 dBm/ch, −21 dBm/ch, −24 dBm/ch and −27 dBm/ch, respectively. As shown in FIGS. 2–6, the gain deviations ΔG in the above-mentioned cases are 0.43 dB, 2.90 dB, 5.10 dB, 7.10 dB, 8.91 dB and 10.40 dB, respectively.

Moreover, the gain deviation is varied largely with the change in the environmental temperature of the EDF itself, even if the input power is substantially the same. FIGS. 7–10 are diagrams showing a relationship between the temperature change and the change of the gain deviation of the specific EDF for which the measurements shown in FIGS. 1–6 are performed, in a case where pumping light has a specific power. The EDF subjected to the measurements shown in FIGS. 7–10 is adjusted to have the gain deviation ΔG smaller than 0.8 dB for the respective input powers Pin at the environmental temperature of the EDF of 25° C. It is apparent from these measurements that when the environmental temperature of the EDF is changed, the gain deviation ΔG is also changed largely depending on the temperature change for any input power Pin.

As is apparent from the above, it is necessary to make compensation considering two variable factors, i.e., the change in the input power and the temperature change, in order to compensate the gain deviation of the L-band EDFA.

However, the gain cannot be flattened by a known technique for compensating the gain deviation, if the input power and the temperature are changed.

Moreover, there is no specific technique for compensating the change of the gain deviation of the EDF caused by the temperature-dependence of the L-band EDFA.

For the reasons mentioned above, in order to realize a long-distance optical transmission using the L-band EDFA as a relay, it is required to uniformly amplify the input signal light beams having a plurality of wavelengths but substantially the same power and then output the amplified signal light beams.

SUMMARY OF THE INVENTION

In order to solve the above-mentioned problems, an optical fiber amplifier according to the present invention includes an erbium-doped optical fiber to which a multiplexed optical signal into which a plurality of optical signals in a long-wavelength band are multiplexed is supplied and which performs amplification in the long-wavelength band; a forward-pumping light source which supplies forward-pumping light to the erbium-doped fiber; and a backward-pumping light source which supplies backward-pumping light to the erbium-doped optical fiber, the backward-pumping light source having an output power variable based on a control signal, wherein the control signal is output from a control circuit based on an input power of the multiplexed optical signal input to the erbium-doped optical fiber and a temperature of the erbium-doped optical fiber, the control signal changing an output power of the backward-pumping light source so as to cancel deviation of the amplification of the multiplexed optical signal.

Alternatively, the control circuit may output a control signal based on the deviation of the amplified multiplexed optical signal output from the erbium-doped optical fiber, so as to change the output power of the backward-pumping light source to cancel the deviation.

BRIEF DESCRIPTION OF THE DRAWINGS

FIG. 22 shows the details of a parameter table 12 in the first embodiment.

FIG. 26 shows the details of a parameter table 12 in the fourth embodiment.

FIG. 34 shows an exemplary structure of an output-light-deviation detector A in the seventh embodiment in which at least one photo-diode serving as a light receiving portion is replaced with an output monitor such as a channel monitor or the like.

FIG. 43 shows the details of a parameter table 12 in the tenth embodiment.

FIG. 47 shows a control method by a control circuit 33 in the eleventh embodiment.

DETAILED DESCRIPTION OF THE PREFERRED EMBODIMENTS

Prior to describing preferred embodiments of the present invention, an optical amplification in an L-band EDFA that constitutes a basis for the present invention is described.

In the present application, a pumping method in which pumping light is directed to an EDF from the same direction as input signal light is referred to as "forward pumping," whereas a pumping method in which the pumping light is directed to the EDF from the opposite direction to the input signal light is referred to as "backward pumping." In addition, a pumping method corresponding to a combination of the forward pumping and the backward pumping is referred to as "bidirectional pumping."

A typical C-band EDFA is made to operate by placing the EDF in a state of population inversion completely by the pumping light. On the other hand, the L-band EDFA is made to operate in a state in which about 30–40% pumping compared to the population inversion state occurs, so as to shift the wavelength band in which the amplification occurs toward a longer wavelength band. In order to realize such an operation, the L-band EDFA requires an EDF of about 10 times longer than that incorporated in the conventional C-band EDFA, in a case where the pumping power is substantially the same. As a result, the L-band EDFA can have amplification characteristics different from those of the conventional C-band EDFA.

Figure 12:
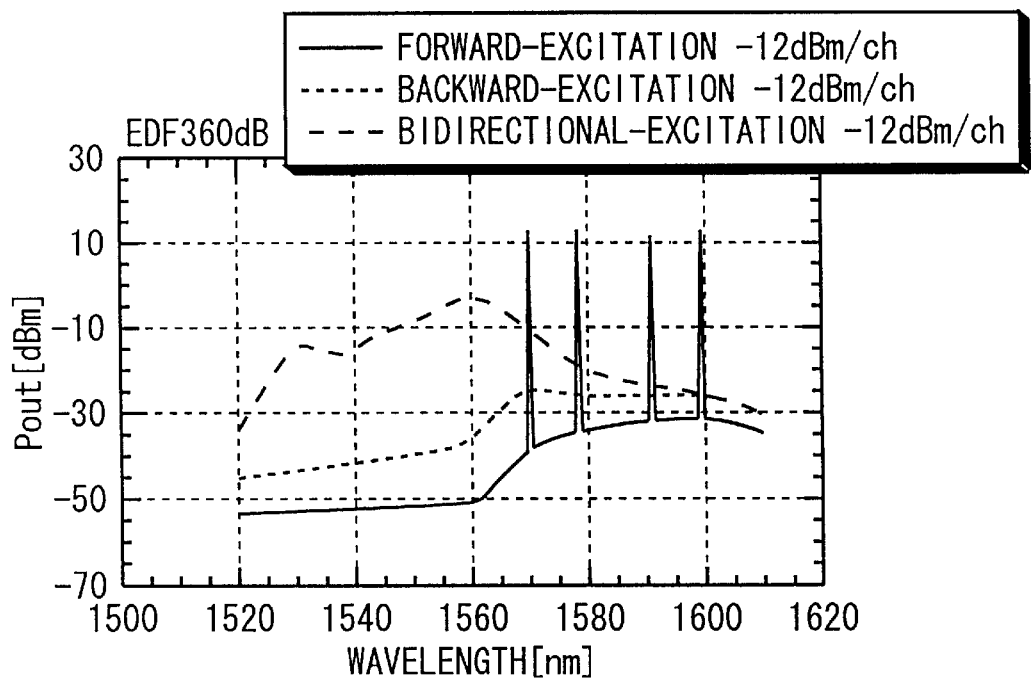
FIG. 12 shows a relationship between an input power of input signal light and the gain deviation of an L-band EDFA.
Figure 13:
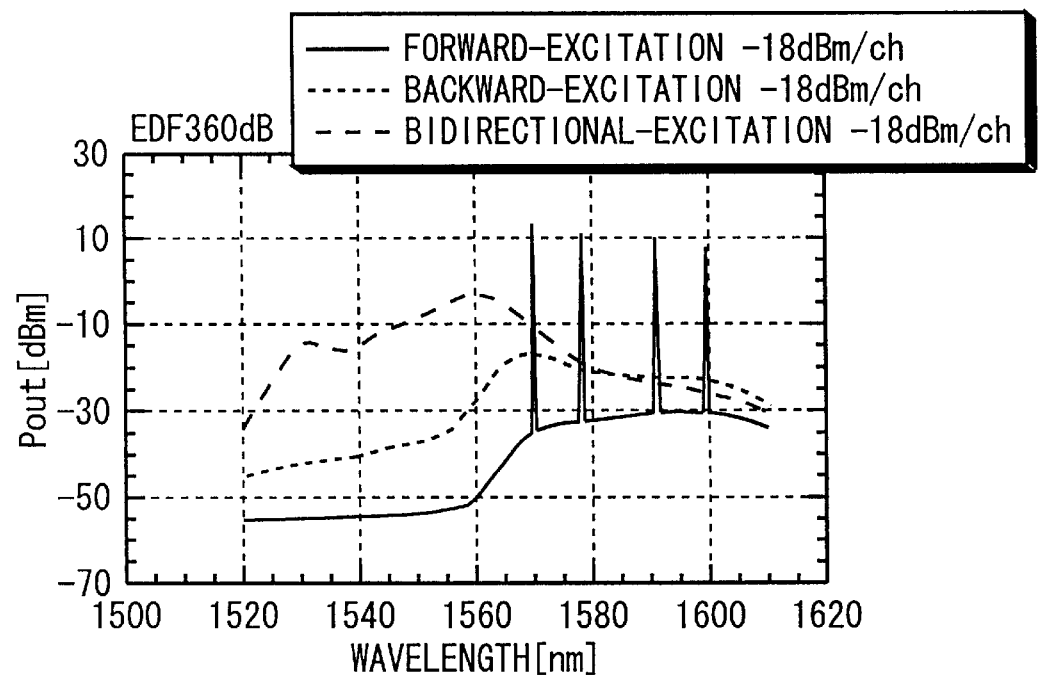
FIG. 13 shows a relationship between an input power of input signal light and the gain deviation of an L-band EDFA.
Figure 14:
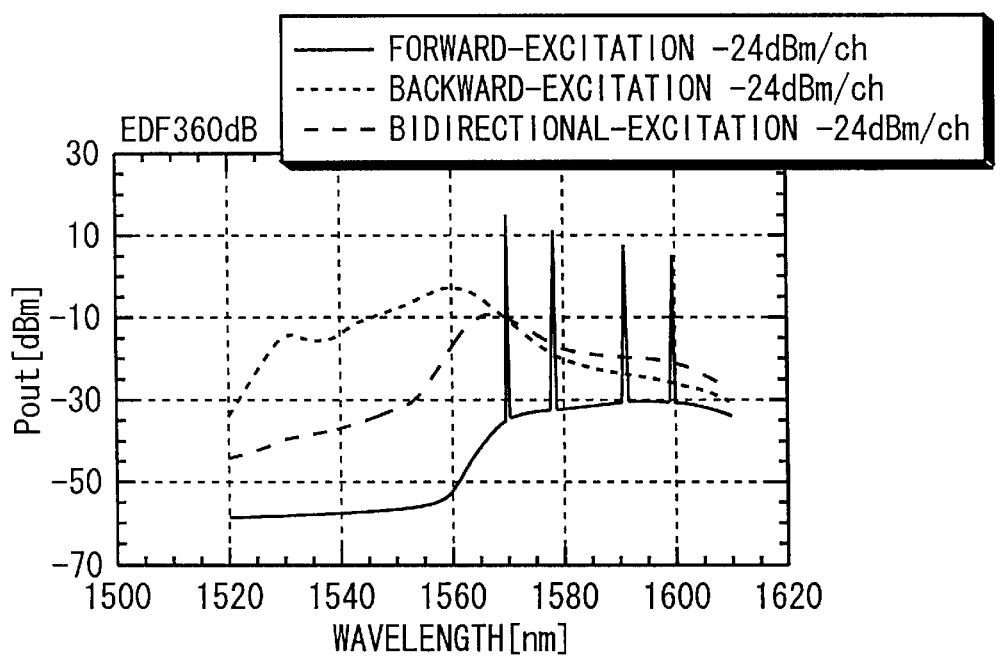
FIG. 14 shows a relationship between an input power of input signal light and the gain deviation of an L-band EDFA.

FIGS. 12–14 are diagrams showing a relationship between the input power of the input signal light and inclination of a wavelength-dependent output in a typical L-band EDFA used for amplification in the long-wavelength band (1580 nm-band), in cases of the input power of −12 dBm/ch, −18 dBm/ch and −24 dBm/ch, respectively. In each diagram, the relationship is shown for each of the three pumping methods, i.e., the forward pumping, the backward pumping and the bidirectional pumping. In addition, in FIGS. 12–14, the power of the pumping light is set to 100 mW in each of the forward pumping and the backward pumping, while in the bidirectional pumping (i.e., the combination of the forward pumping and the backward pumping) the power of the pumping light is set to 100 mW+100 mW.

As is apparent from FIGS. 12–14, when the forward pumping is compared to the backward pumping, the gain in the 1570 nm-band tends to be higher in the backward pumping than that in the forward pumping, when the pumping light has the same power. In addition, the relationship between the gain deviation and the power of the input signal light in the backward pumping has tendency in which the output in the 1570 nm-band becomes larger as the input power becomes lower. With respect to any input power, however, the line of the wavelength-dependent output in the case of the forward pumping is inclined toward opposite direction to that in the case of the backward pumping. In other words, the gain becomes larger as the wavelength becomes longer in the case of the forward pumping, whereas the gain becomes larger as the wavelength becomes shorter in the case of the backward pumping.

Based on the above-mentioned relationship, the gain deviation can be reduced or compensated by appropriately adjusting the power of the pumping light in the backward pumping with respect to the reduction in the input power.

Figure 15:
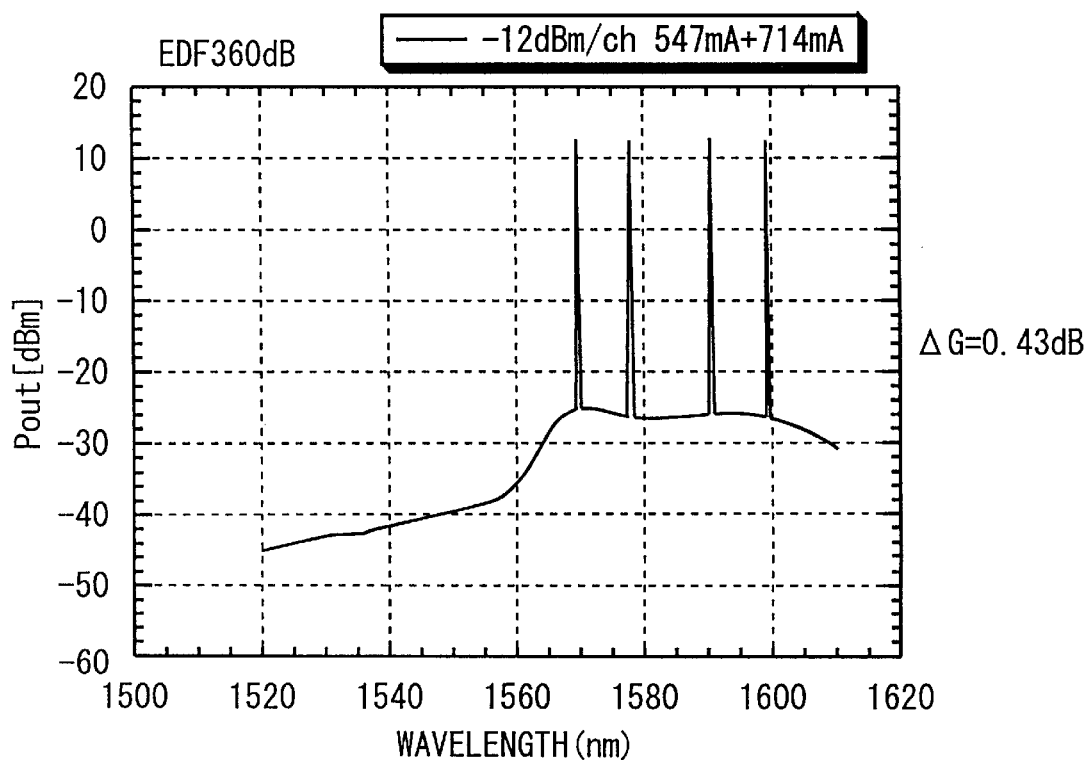
FIG. 15 corresponds to FIG. 12 and shows an adjustment result in which a backward pump power is adjusted in a case where the input power of the input signal light is −12 dBm/ch and a forward pump power is 100 mW.
Figure 17:
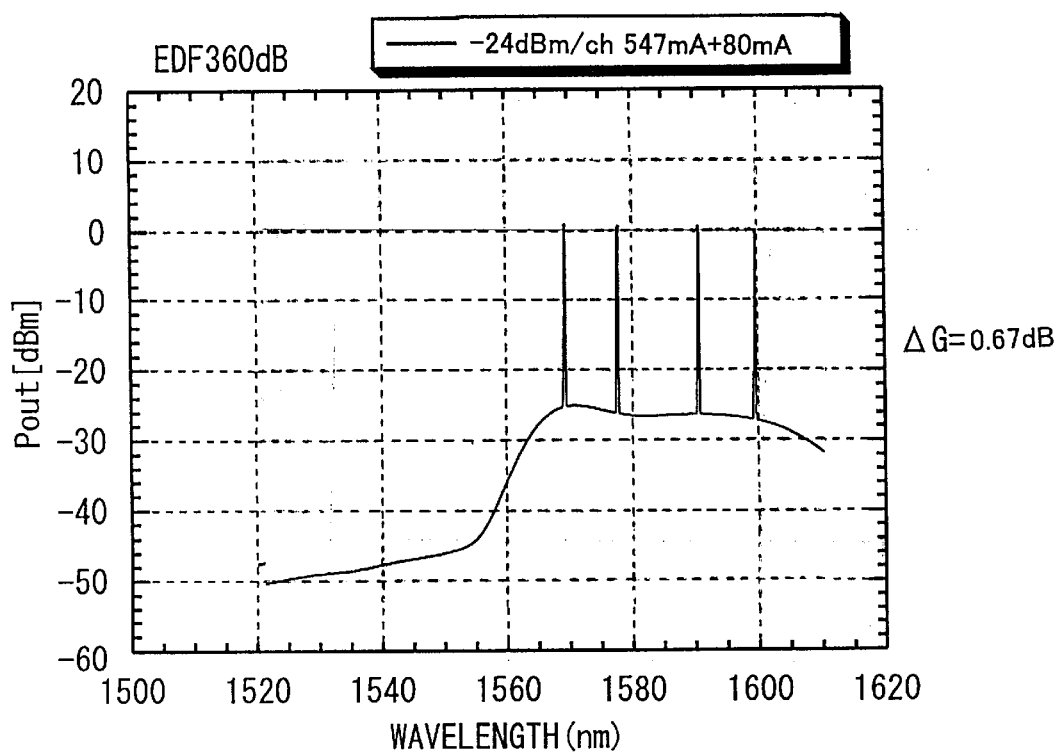
FIG. 17 corresponds to FIG. 14 and shows an adjustment result in which the power of the pumping light in the backward pumping is adjusted in a case where the input power of the input signal light is −24 dBm/ch and the power of the pumping light in forward pumping is 100 mw.
Figure 16:
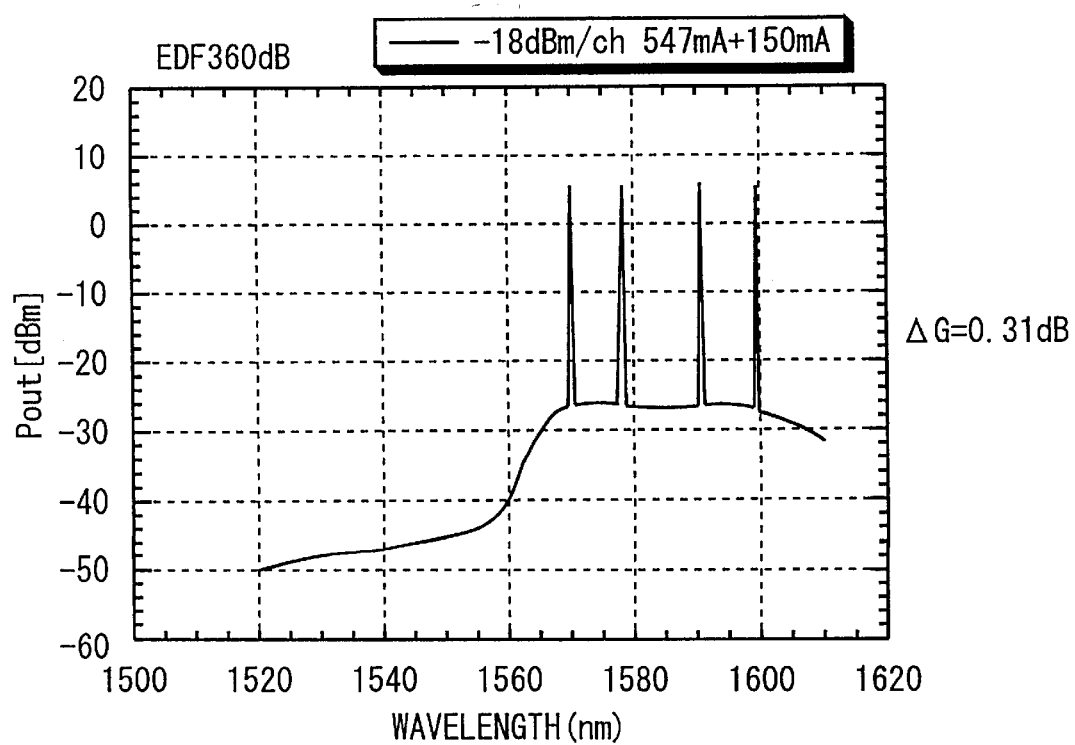
FIG. 16 corresponds to FIG. 13 and shows an adjustment result in which the power of the pumping light in the backward pumping is adjusted in a case where the input power of the input signal light is −18 dBm/ch and the power of the pumping light in the forward pumping is 100 mW.
Figure 18:
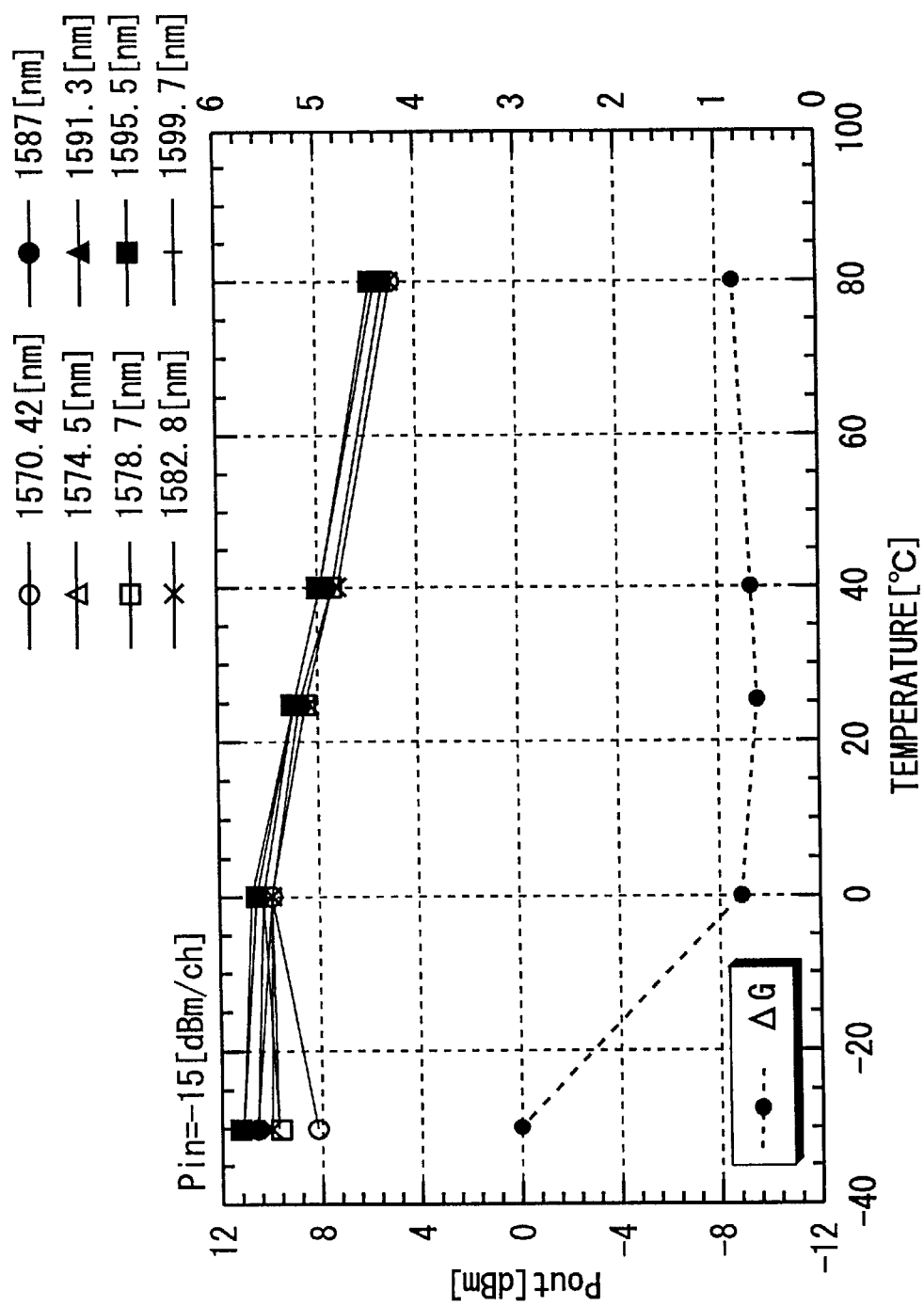
FIG. 18 shows an adjustment result in which the power of the pumping light in the backward pumping is adjusted depending on a change of an environmental temperature in a case where the input power of the input signal light is −15 dBm/ch.
Figure 19:
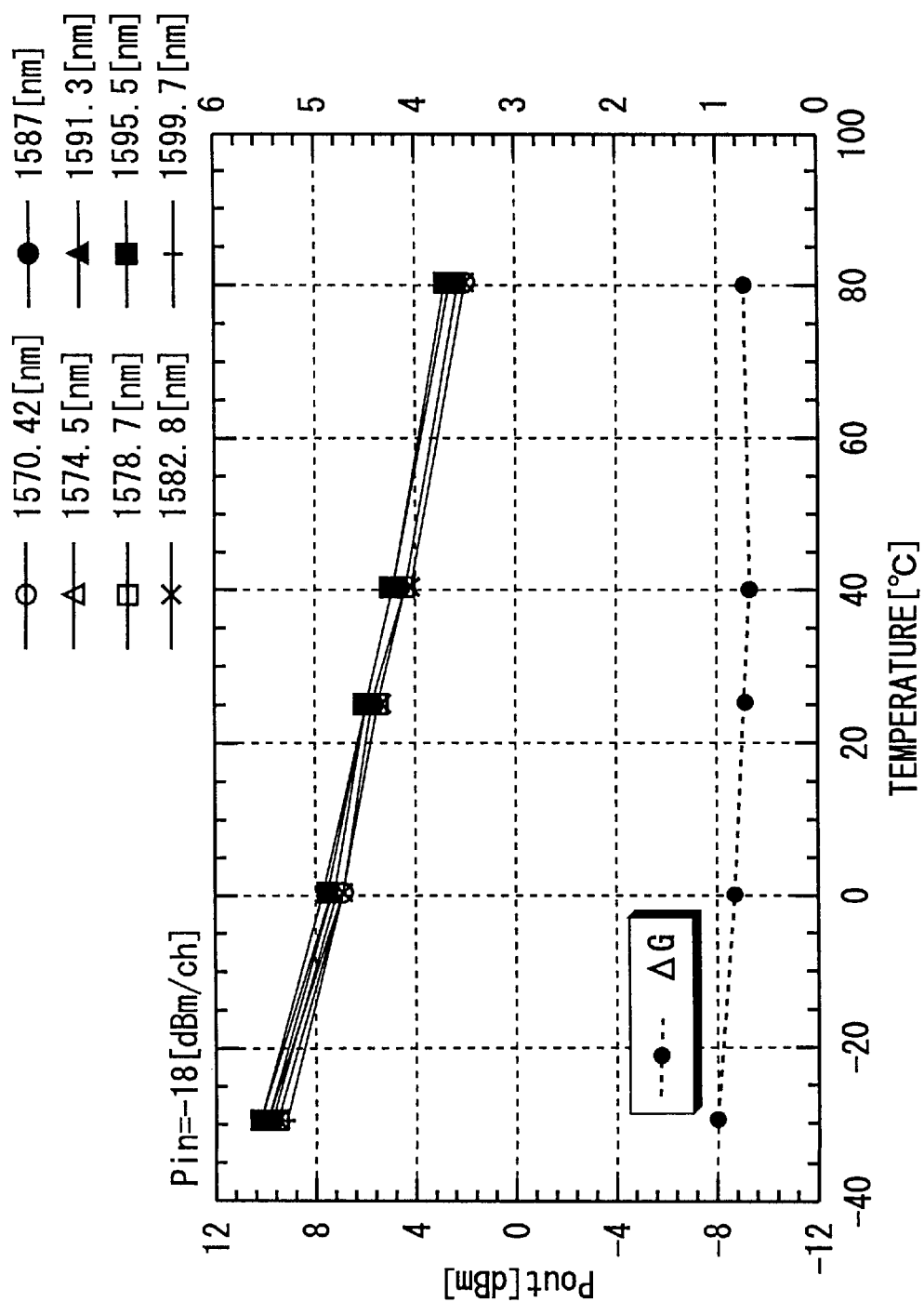
FIG. 19 shows an adjustment result in which the power of the pumping light in the backward pumping is adjusted depending on the change of the environmental temperature in a case where the input power of the input signal light is −18 dBm/ch.
Figure 20:
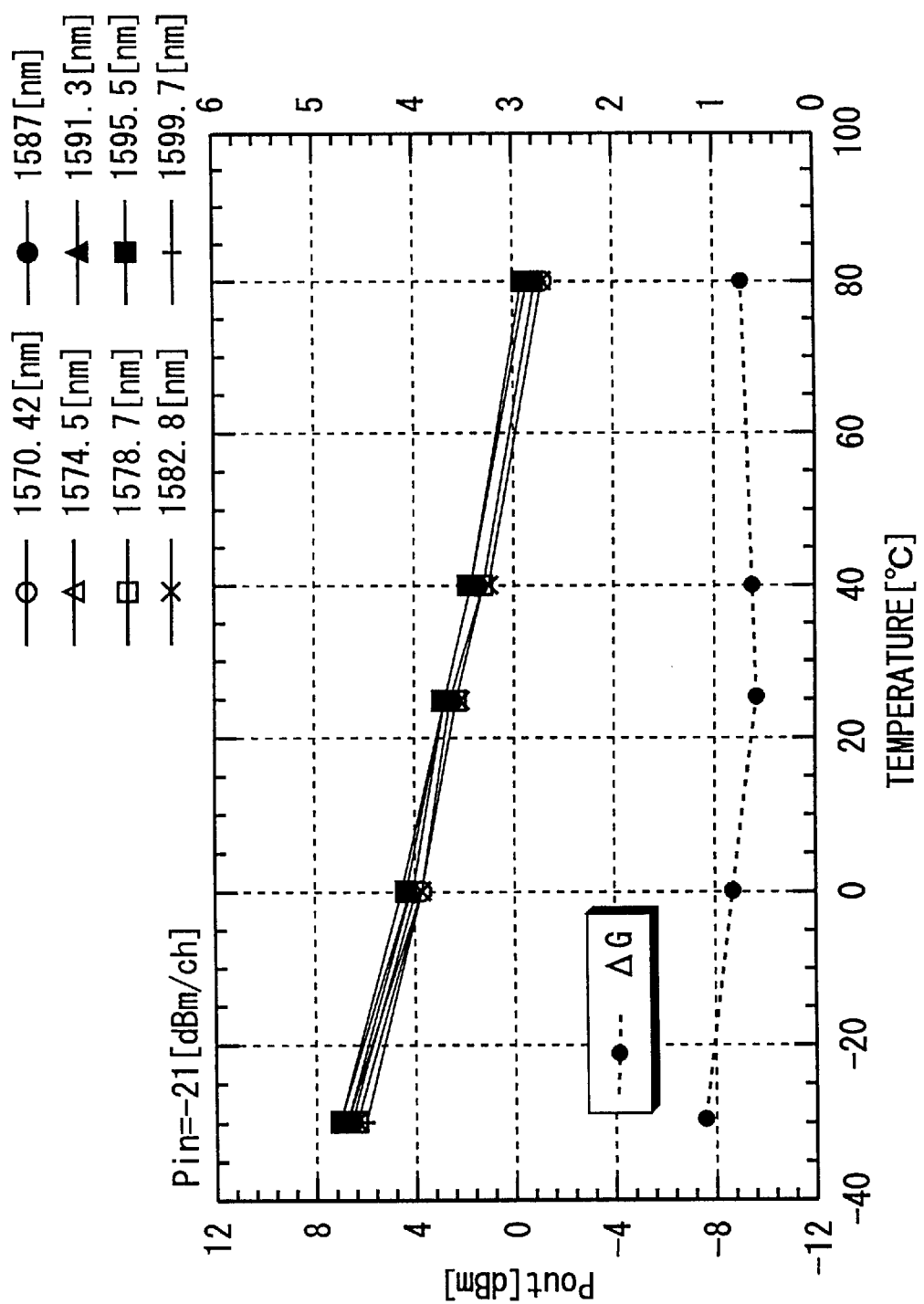
FIG. 20 shows an adjustment result in which the power of the pumping light in the backward pumping is adjusted depending on the change of the environmental temperature in a case where the input power of the input signal light is −21 dBm/ch.
Figure 21:
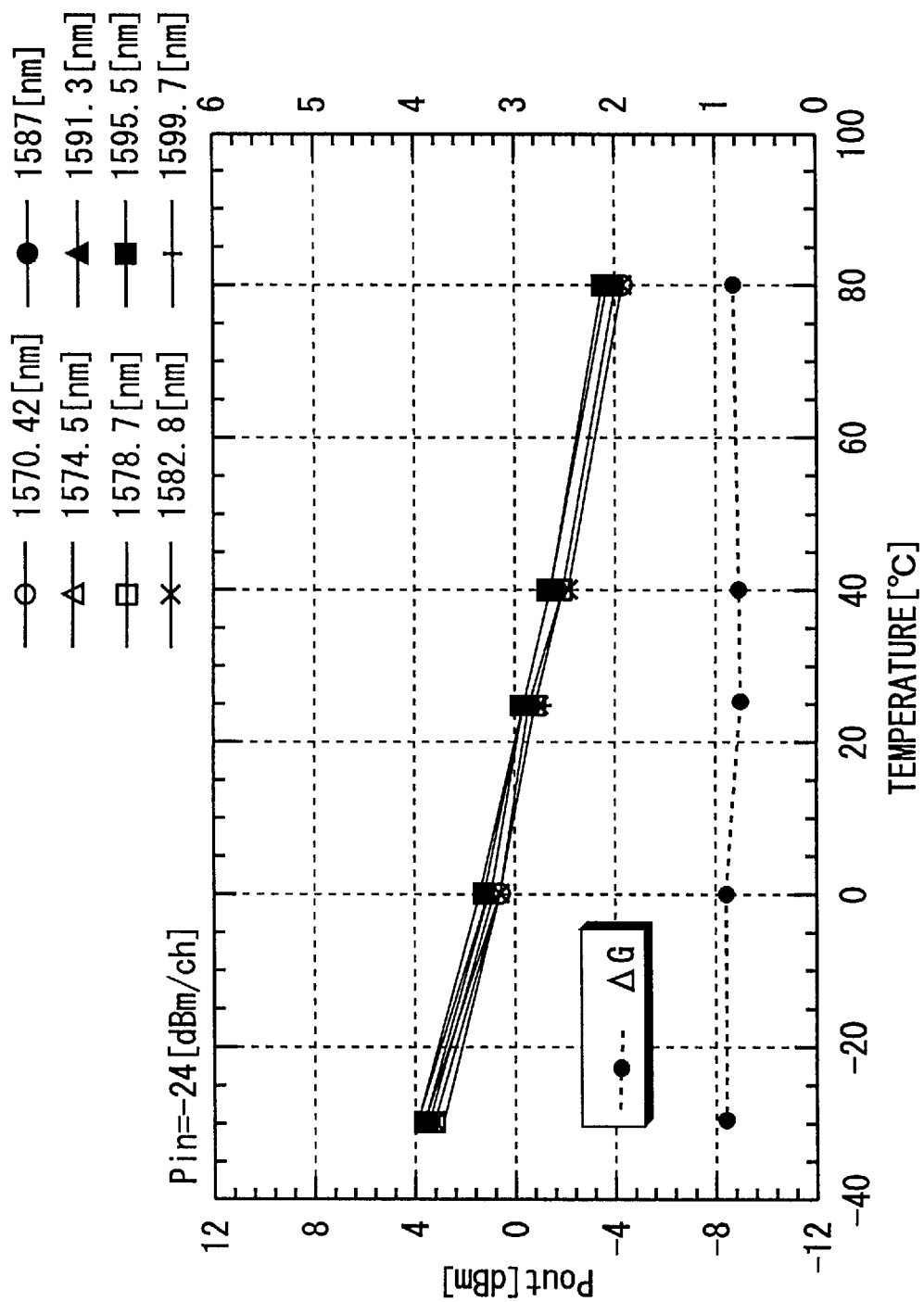
FIG. 21 shows an adjustment result in which the power of the pumping light in the backward pumping is adjusted depending on the change of the environmental temperature in a case where the input power of the input signal light is −24 dBm/ch.

FIGS. 15–17 show results of adjustment in which the power of the pumping light in the backward pumping was actually adjusted based on the above concept for flattening the output.

FIGS. 15–17 are diagrams corresponding to FIGS. 12–14, respectively and show the results of the adjustments of the backward pump power, with the pumping light power in the forward pumping of 100 mW. FIG. 15 shows the adjustment result with the input power Pin of −12 dBm/ch; FIG. 16 shows that with the input power Pin of −18 dBM/ch; and FIG. 17 shows that with the input power Pin of −24 dBm/ch. In the measurements shown in FIGS. 15–17, the backward pump power was adjusted to be 100 mW, 26 mW, and 7 mW, respectively. As a result of such an adjustment, the gain deviations ΔG in the respective measurements were 0.43 dB, 0.31 dB and 0.67 dB, respectively. From this result, it is apparent that the gain deviation can be compensated irrespective of the input power Pin.

The above measurements were performed under a condition in which an environmental temperature of the EDF is substantially constant. The gain deviation, however, can be varied depending on the environmental temperature of the EDF, as described before. The measurements shown in FIGS. 7–10 were performed in the conditions in which the pumping power in the backward pumping was adjusted so as to minimize the gain deviation for the respective input powers of −15 dBm/ch, −18 dBm/ch, −21 dBm/ch and −24 dBm/ch while the environmental temperature of EDF was 25° C. However, the gain deviation increases when the environmental temperature is changed from 25° C., even if the input light power and the pumping light power are kept the same.

If the environmental temperature of the EDF is changed, however, there is a backward pump power that minimizes the gain deviation for a specific environmental temperature and a specific input light power, because tendency of the inclination of the wavelength-dependent output in the forward pumping is opposite to that in the backward pumping. FIGS. 18–21 show results of adjustments in which the backward pump power is appropriately adjusted depending on the change of the environmental temperature for the input light powers of −15 dBm/ch, −18 dBm/ch, −21 dBm/ch and −24 dBm/ch, respectively. As is apparent from FIGS. 18–21, the gain deviation can be reduced by adjusting the backward pump power, although the absolute value of the pumping light power is different from that in the above-mentioned condition in which the environmental temperature is 25° C. and the gain deviation is minimum.

As is apparent from the above description, the backward pump power for providing the minimum gain deviation of the L-band EDFA can be determined based on the input light power and the environmental temperature of the EDF, although a specific value for such a pumping light power is varied depending on the characteristics of the EDF incorporated in the EDFA. Therefore, the gain deviation can be reduced to follow both the change of the input light power and the change of the environmental temperature, by measuring the input light power and the environmental temperature and then controlling the backward pump power so as to minimize the gain deviation with the measured input light power at the measured environmental temperature.

In the above, a basic concept of the present invention is described. Next, preferred embodiments of the present invention are described referring to the drawings.

Embodiment 1

Figure 1:
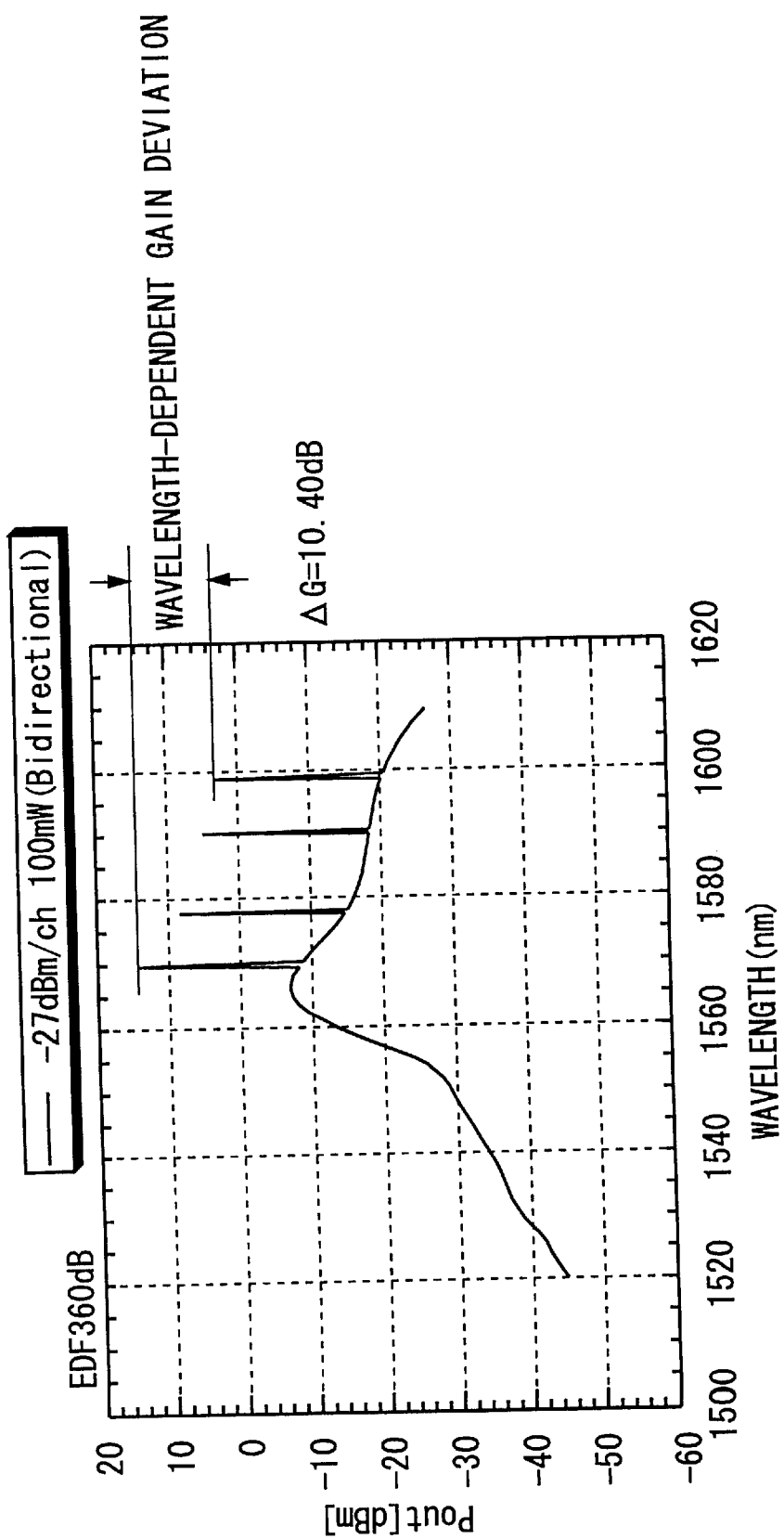
FIG. 1 shows wavelength-dependent gain deviation of an L-band EDFA.
Figure 2:
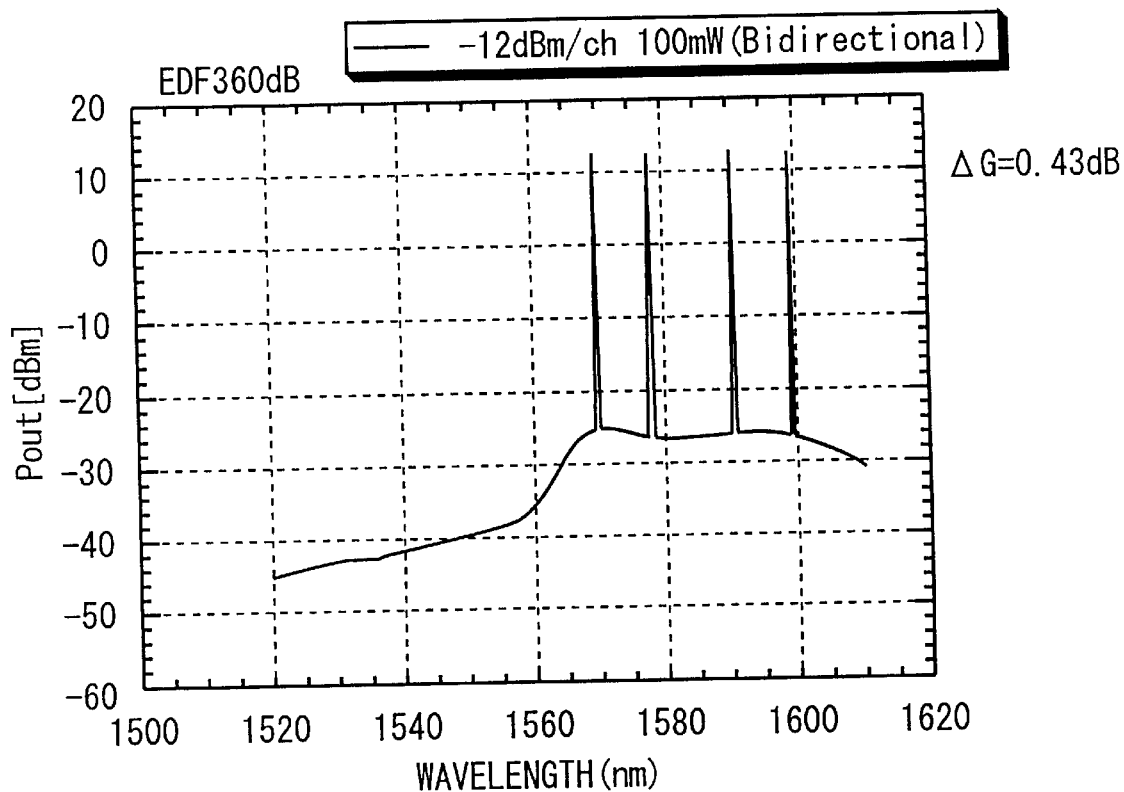
FIG. 2 shows the gain deviation of the L-band EDFA for which the measurement shown in FIG. 1 is performed, when a power of input signal light −12 dBm/ch while other conditions are kept the same.
Figure 3:
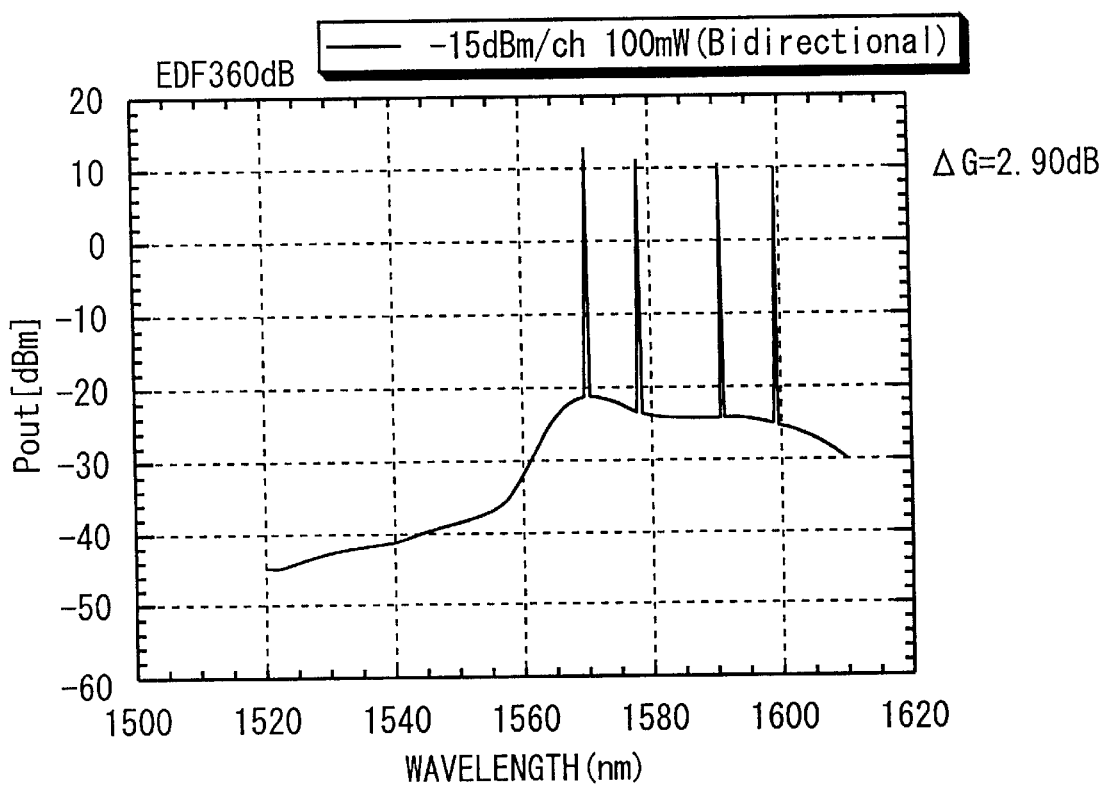
FIG. 3 shows the gain deviation of the L-band EDFA for which the measurement shown in FIG. 1 is performed, when a power of input signal light −15 dBm/ch while other conditions are kept the same.
Figure 4:
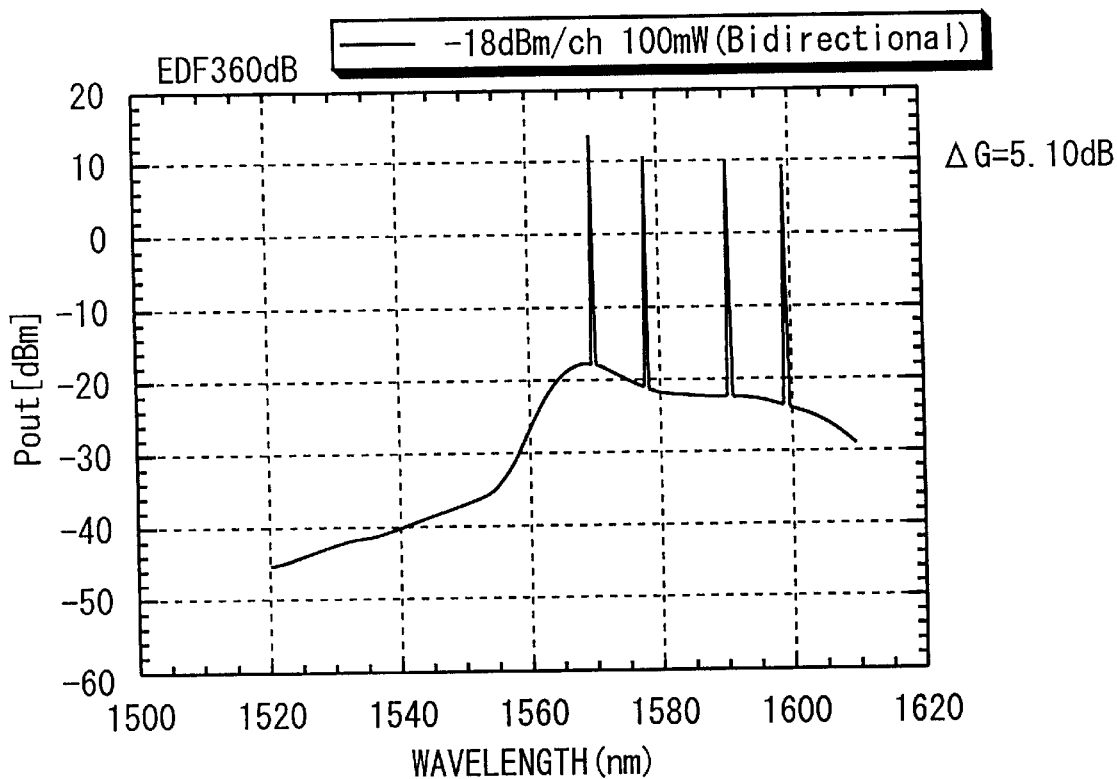
FIG. 4 shows the gain deviation of the L-band EDFA for which the measurement shown in FIG. 1 is performed, when a power of input signal light −18 dBm/ch while other conditions are kept the same.
Figure 5:
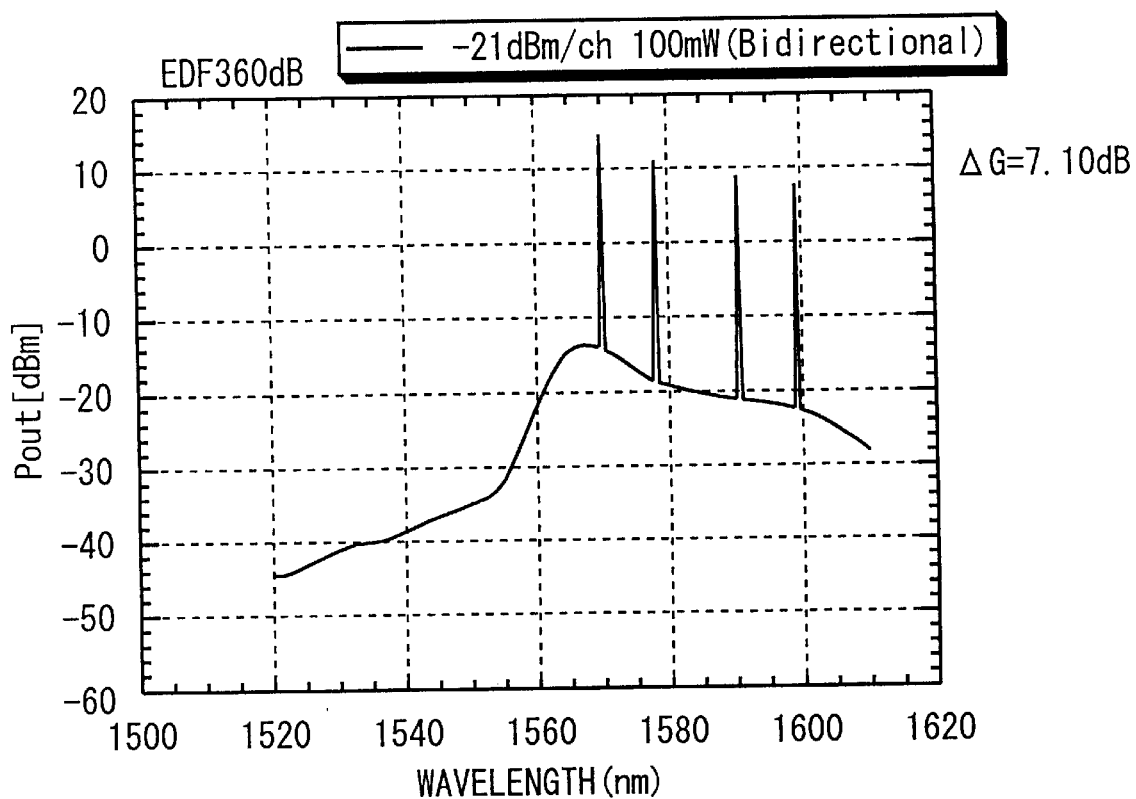
FIG. 5 shows the gain deviation of the L-band EDFA for which the measurement shown in FIG. 1 is performed, when a power of input signal light −21 dBm/ch while other conditions are kept the same.
Figure 6:
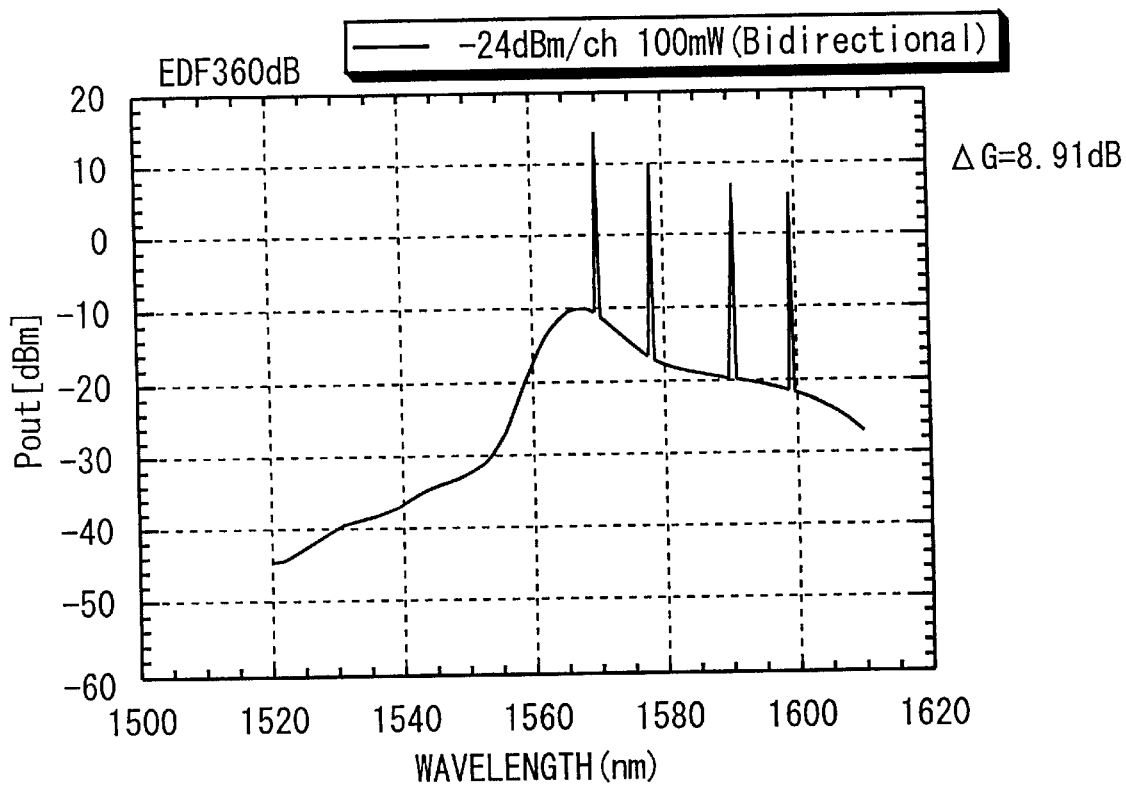
FIG. 6 shows the gain deviation of the L-band EDFA for which the measurement shown in FIG. 1 is performed, when a power of input signal light −24 dBm/ch while other conditions are kept the same.
Figure 7:
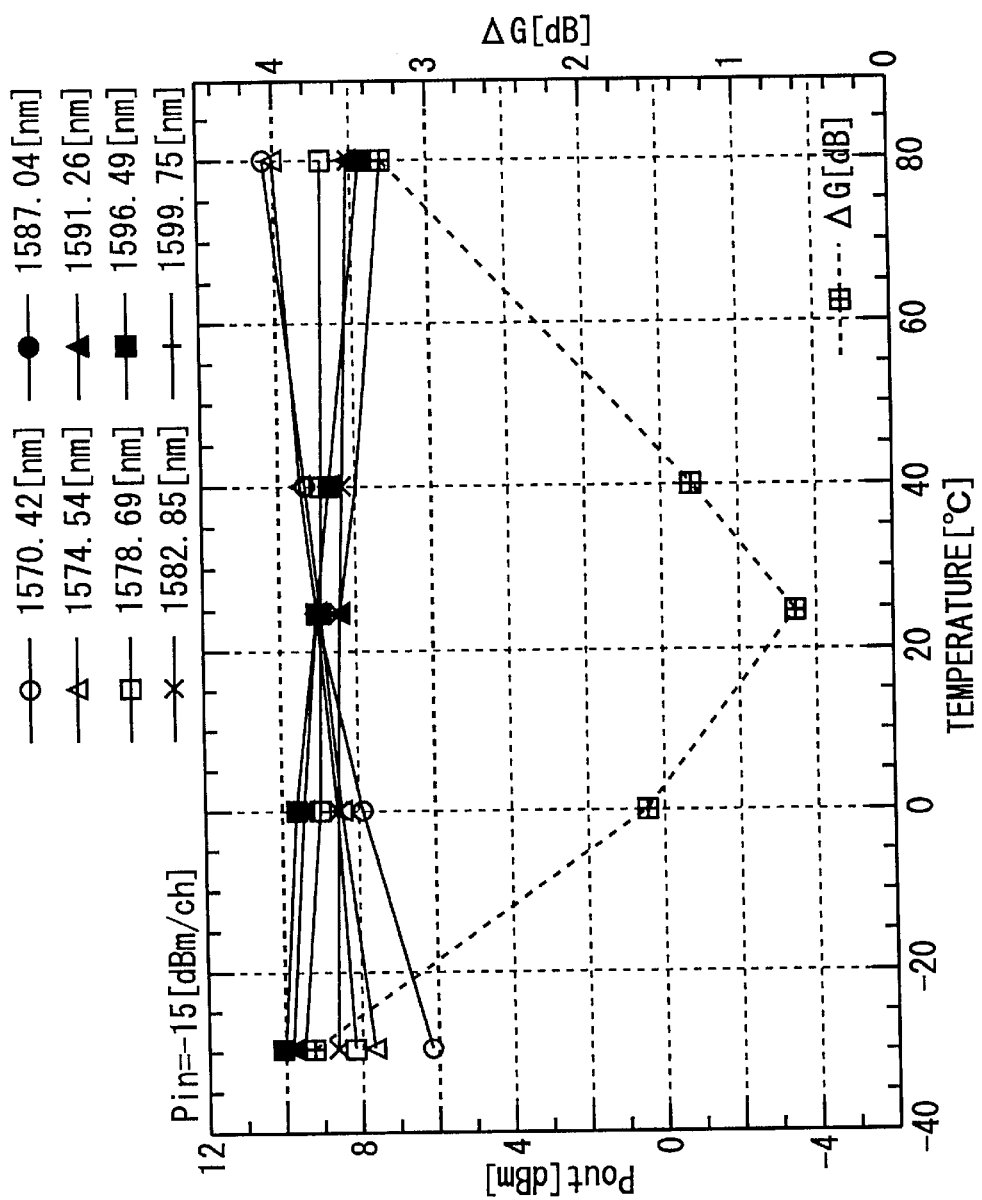
FIG. 7 shows a relationship between a temperature change and a change of the gain deviation of the EDF for which the measurements shown in FIGS. 1–6 are performed under a specific pumping power.
Figure 8:
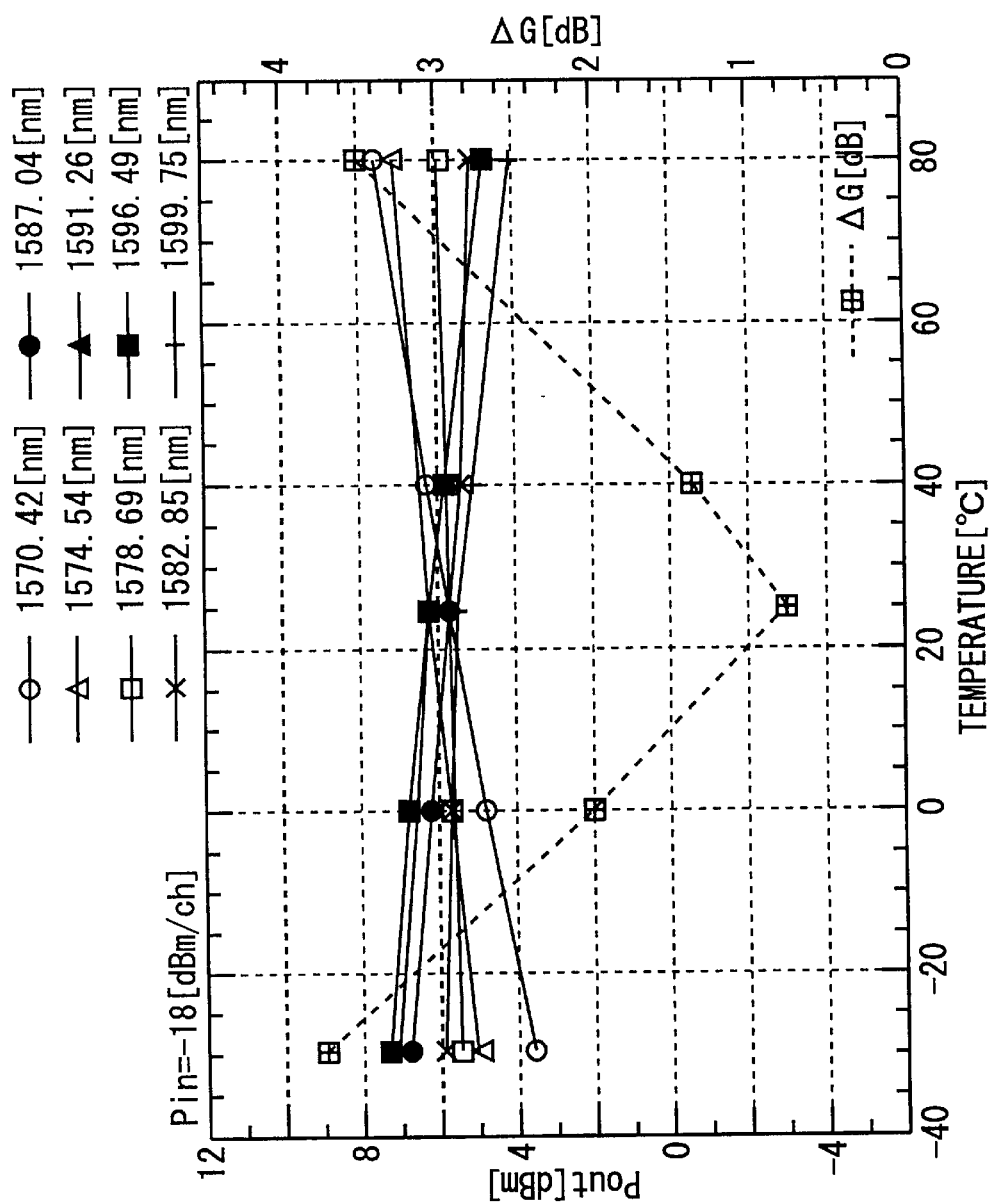
FIG. 8 shows a relationship between a temperature change and a change of the gain deviation of EDF for which the measurements shown in FIGS. 1–6 are performed under a specific pumping power.
Figure 9:
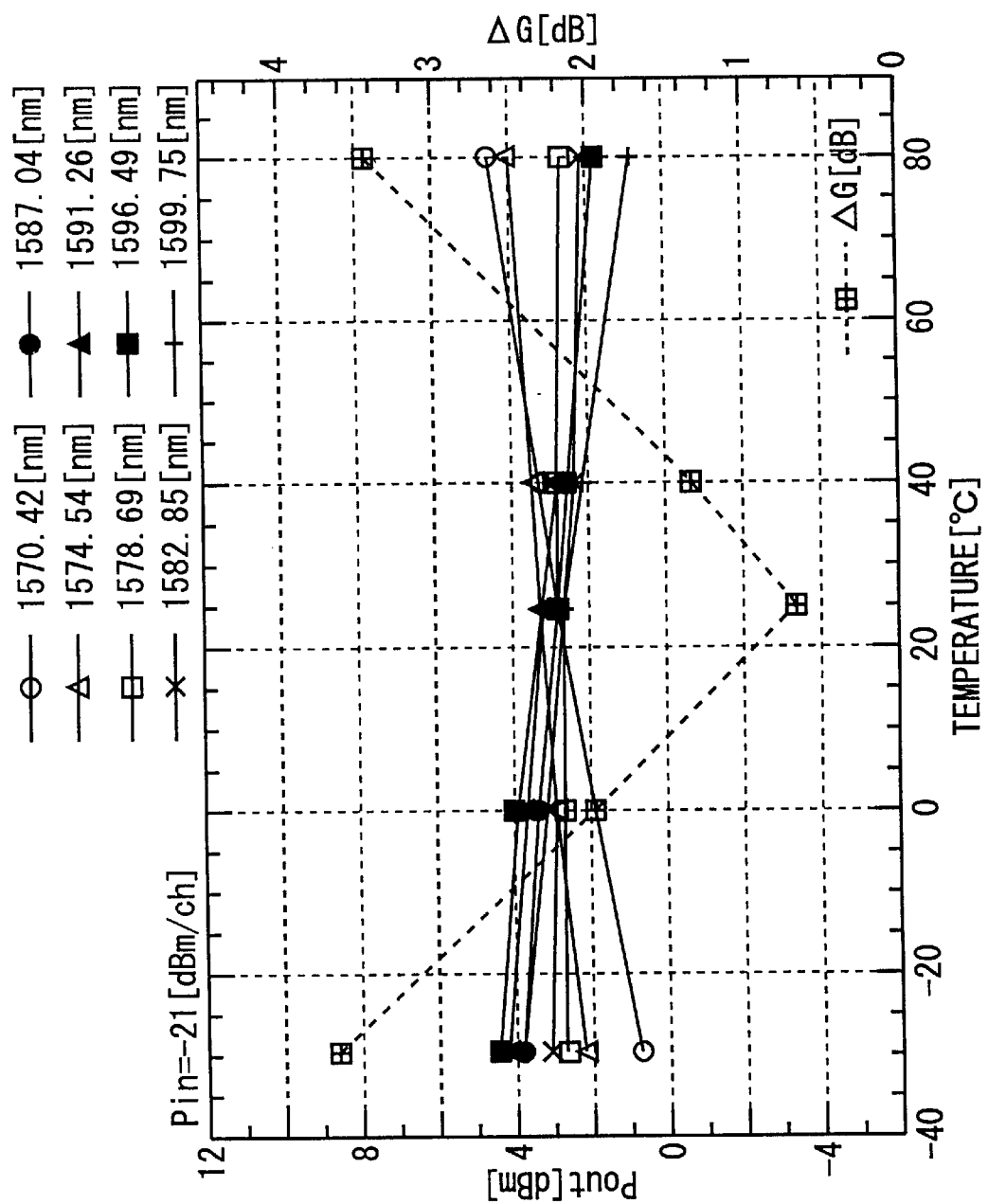
FIG. 9 shows a relationship between a temperature change and a change of the gain deviation of the EDF for which the measurements shown in FIGS. 1–6 are performed under a specific pumping power.
Figure 10:
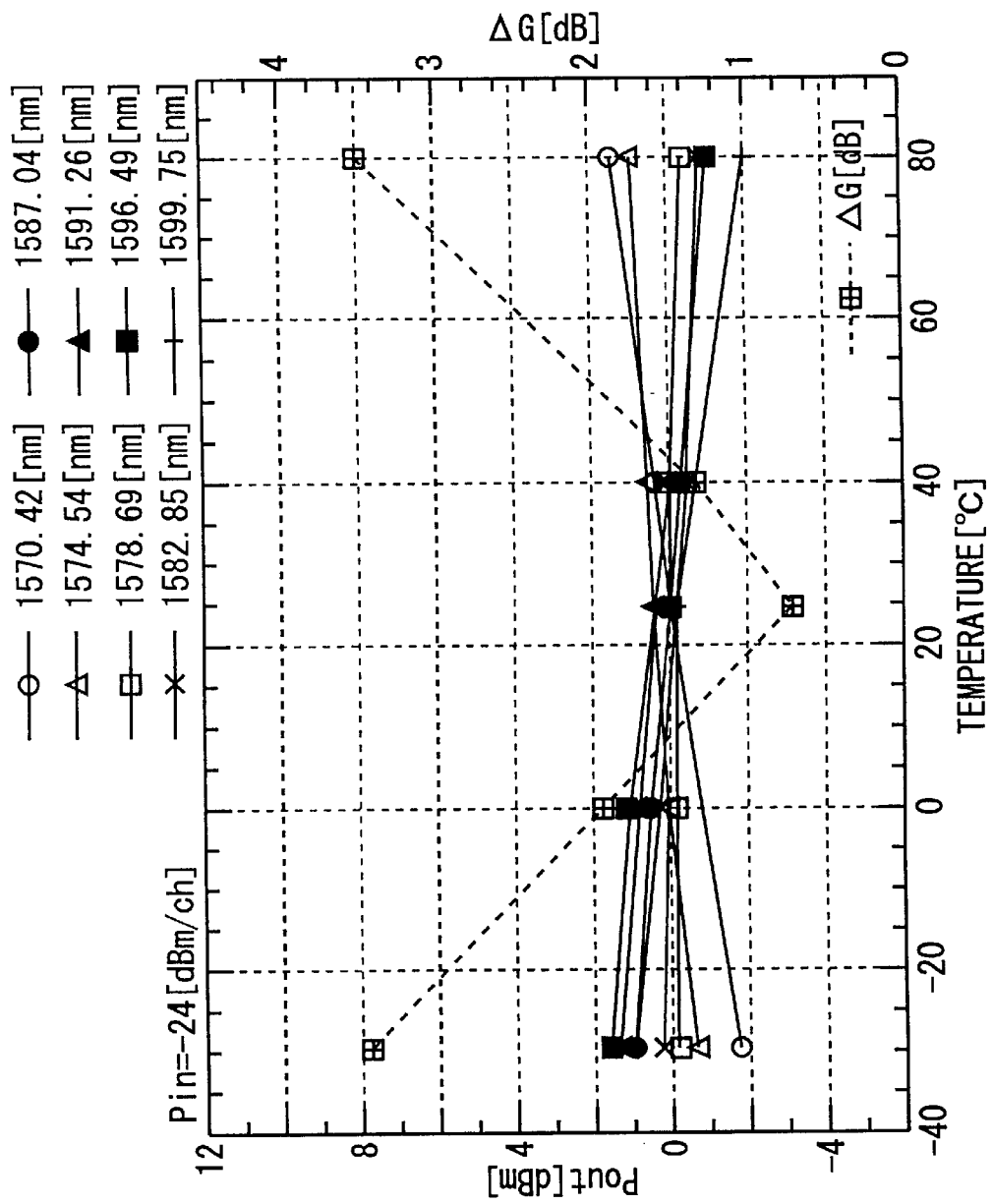
FIG. 10 shows a relationship between a temperature change and a change of the gain deviation of the EDF for which the measurements shown in FIGS. 1–6 are performed under a specific pumping power.
Figure 11:
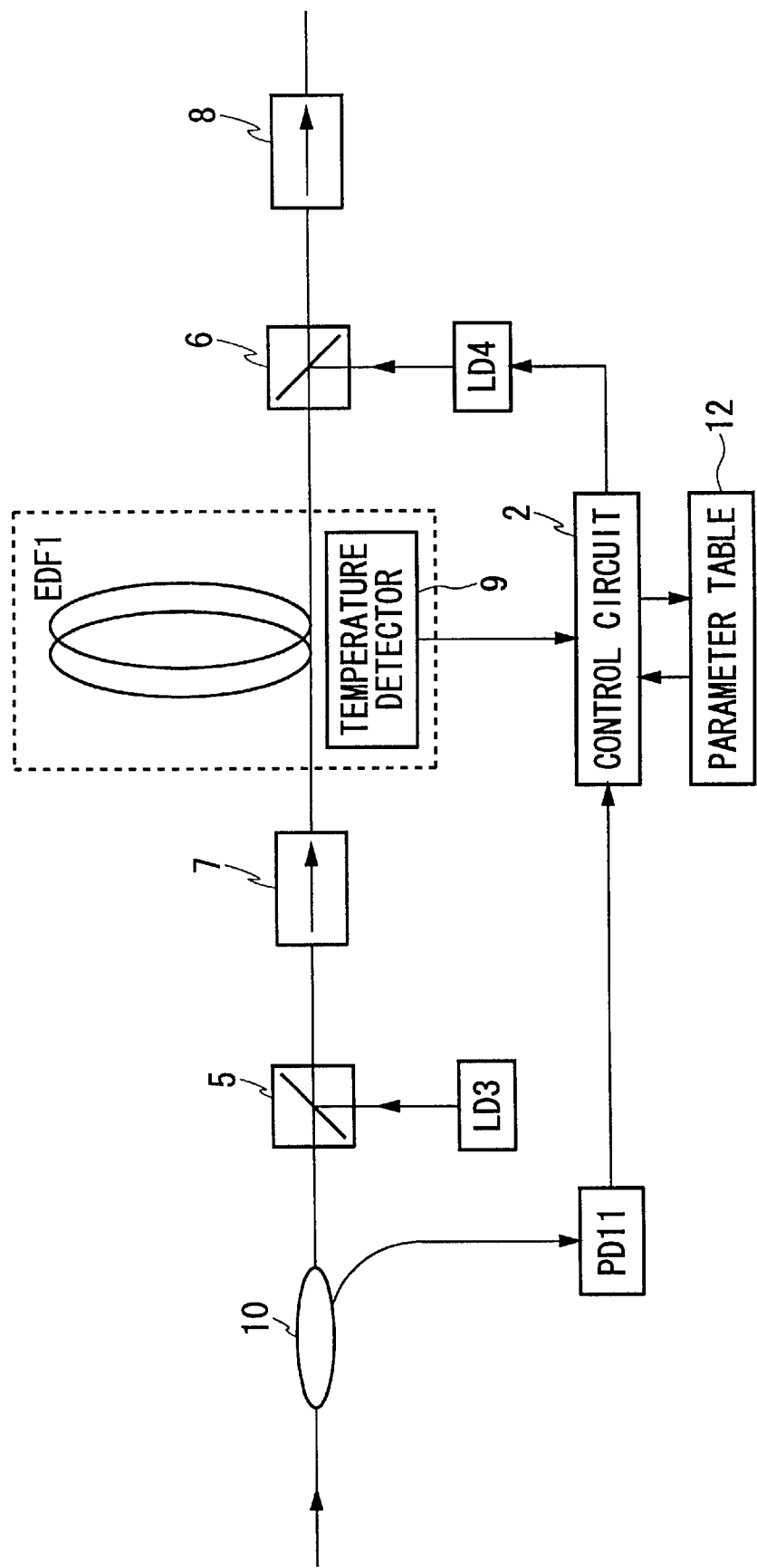
FIG. 11 is a diagram schematically showing a structure of a bidirectional-pumping L-band EDFA according to a first embodiment of the present invention.

FIG. 11 is a diagram schematically showing a structure of a bidirectional-pumping L-band EDFA according to the first embodiment of the present invention. The L-band EDFA shown in FIG. 11 is an amplifier that amplifies a multiplexed optical signal into which a plurality of optical signals in the long wavelength band are wavelength-multiplexed. The L-band EDFA includes an optical coupler 10, a WDM coupler 5 having wavelength-selectivity, an isolator 7, an EDF 1, another WDM coupler 6 having wavelength-selectivity and another isolator 8 that are disposed on an optical path of the signal light in that order from the light incident side.

To the WDM coupler 5 is connected a forward-pumping light source 3 that is composed of a laser diode (LD). Similarly, to the WDM coupler 6 is connected a backward-pumping light source 4 that is composed of an LD. Pumping light from the forward-pumping light source 3 and the backward-pumping light source 4 is directed to the EDF 1 via the associated WDM couplers 5 and 6.

The forward-pumping light source 3 has a fixed output power, whereas the backward-pumping light source 4 has an output power that is variable based on a control signal.

To the optical coupler 10 is connected a photo-diode (PD) 11 for extracting a part of the input signal light and detecting a power thereof. However, instead of detecting the power of the input signal light into which the plurals of optical signals are multiplexed as in the present embodiment, the power of the input signal light may be obtained by calculation using only a power of a certain optical signal detected, because the plurals of optical signals are set to have substantially the same power when being input to the L-band EDFA.

The L-band EDFA further includes a temperature detector 9 disposed in the vicinity of the EDF 1 for detecting an environmental temperature of the EDF 1. Information about the detected input signal power and information about the detected environmental temperature are sent to a control circuit 2.

The control circuit 2 includes a parameter table 12 stored in a memory. The parameter table 12 includes a matrix defining an output power of the backward-pumping light source 4 which provides the minimum gain deviation for each of combinations of various powers of the input signal light and various environmental temperatures, as shown in FIG. 22. In FIG. 22, Pin denotes the power of the input signal light; T denotes the environmental temperature of the EDF; and Ppump (b) denotes the output power of the backward-pumping light source 4.

The control circuit 2 refers to the parameter table 12 based on the detected input signal power and the detected environmental temperature so as to determine an optimum output power of the backward-pumping light source 4. Then, the control circuit 2 sends out a control signal corresponding to the determined output power of the backward-pumping light source 4.

Consequently, the backward-pumping light source 4 supplies the EDF1 with the optimum output power for allowing the gain deviation to be minimized for the detected input signal power at the detected environmental temperature.

As described above, according to the present embodiment, the gain deviation can be reduced only by controlling the power of the pumping light in the backward pumping based on the power of the input signal light and the environmental temperature.

Embodiment 2

Figure 23:
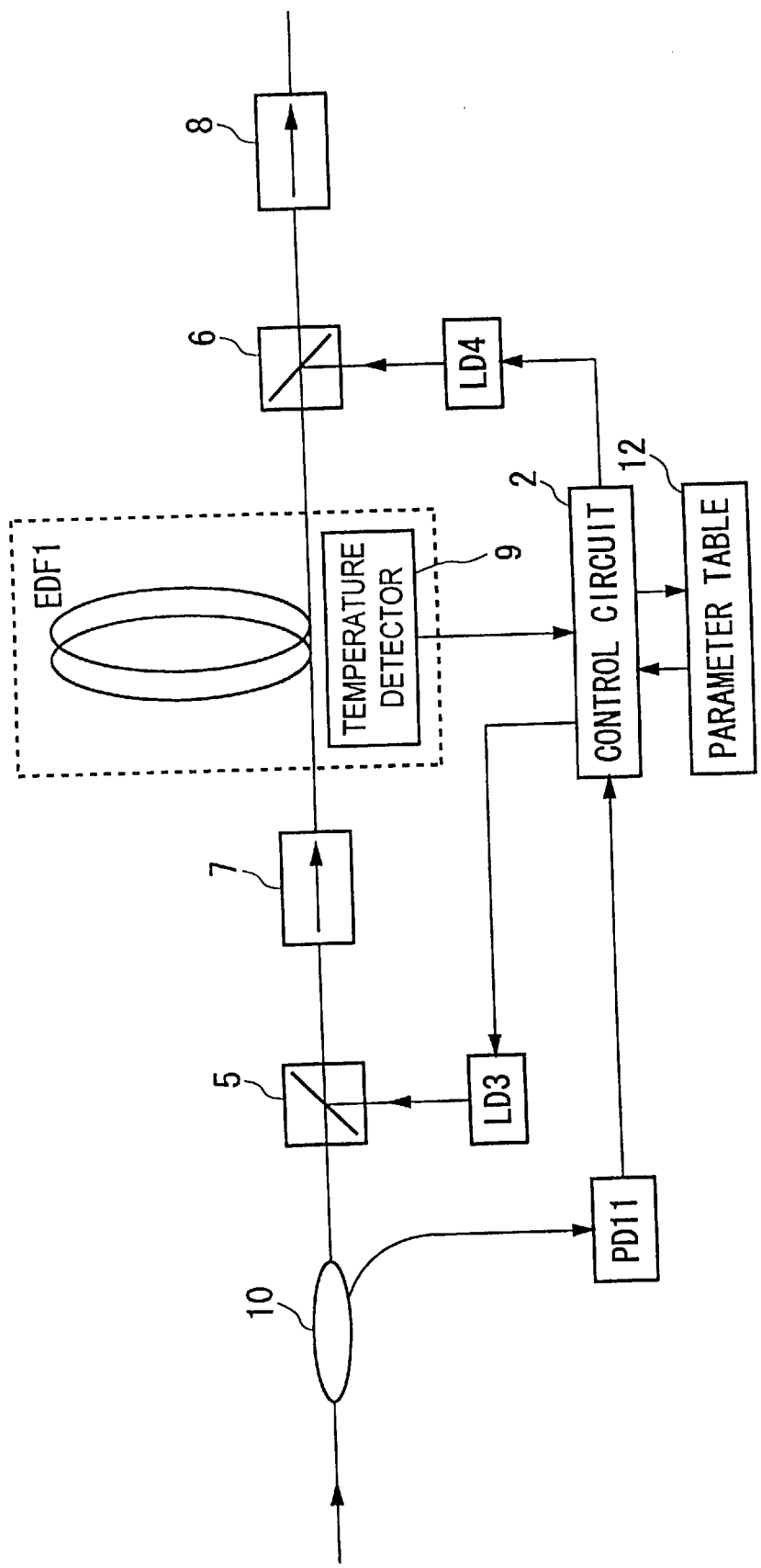
FIG. 23 schematically shows a structure of the bidirectional-pumping L-band EDFA according to a second embodiment of the present invention.

Next, a bidirectional-pumping L-band EDFA according to the second embodiment of the present invention is described with reference to FIG. 23. FIG. 23 schematically shows a structure of the L-band EDFA according to the present embodiment. In FIG. 23, parts similar to those in the first embodiment are shown with the same reference numerals. The L-band EDFA in the present embodiment is different from that in the first embodiment in that the control circuit 2 controls not only the output power of the backward-pumping light source 4 but also that of the forward-pumping light source 3.

The parameter table 12 connected to the control circuit 2 includes a matrix defining the powers of the forward-pumping light source 3 and the backward-pumping light source 4 for providing the minimum gain deviation for each of the combinations of various powers of the input signal light and various environmental temperatures.

The control circuit 2 refers to the parameter table 12 based on the detected input signal power and the detected environmental temperature, so as to determine optimum powers of the forward-pumping light source 3 and the backward-pumping light source 4. The control Circuit 2 then sends the pumping light sources 3 and 4 control signals corresponding to the determined powers of the light sources 3 and 4, respectively.

Consequently, the forward-pumping light source 3 and the backward-pumping light source 4 can supply the EDF1 with the optimum output powers for allowing the minimum gain deviation corresponding to the power of the detected input signal light and the detected environmental temperature.

Although the first embodiment is related to the structure in which only the pumping power in the backward-pumping is controlled, there may be some combinations of the input power of the input light and the environmental temperatures for which the pumping light power in the backward-pumping has to be 0 mW, or a few combinations for which the gain deviation cannot be reduced. In order to avoid such cases, it is preferable to control not only the pumping light power in the backward-pumping but also that in the forward-pumping as described in the present embodiment.

As described above, according to the second embodiment, the output of the EDFA can be flattened for a wider range of the power of the input signal light and a wider range of the environmental temperature than those in the first embodiment, because the pumping light powers in the forward pumping and the backward pumping are optimized based on the power of the input signal light and the environmental temperature that have been detected.

Embodiment 3

Figure 24:
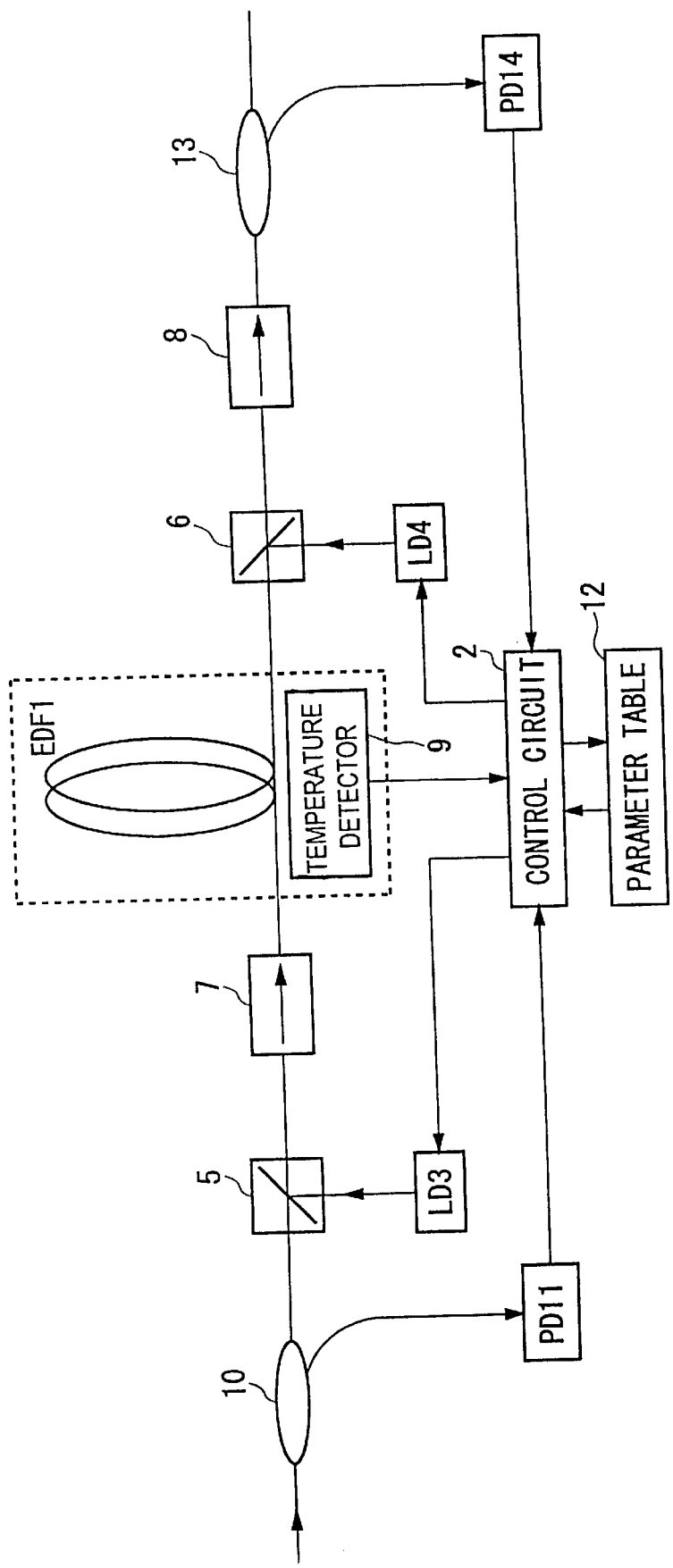
FIG. 24 schematically shows a structure of the bidirectional-pumping L-band EDFA according to a third embodiment of the present invention.

Next, a bidirectional-pumping L-band EDFA according to the third embodiment of the present invention is described with reference to FIG. 24. FIG. 24 schematically shows a structure of the L-band EDFA according to the present embodiment. In FIG. 24, parts similar to those in the first and second embodiments are shown with the same reference numerals. The L-band EDFA in the present embodiment includes the optical coupler 10 which divides the input signal light, the WDM coupler 5 having wavelength-selectivity, the isolator 7, the EDF 1, the WDM coupler 6 having wavelength-selectivity, the isolator 8 and an optical coupler 13 which divides the output signal light, that are disposed on an optical path of the signal light in that order from the light incident side.

To the WDM coupler 5 is connected the forward-pumping light source 3 that is composed of an LD. Similarly, to the WDM coupler 6 is connected the backward-pumping light source 4 that is composed of an LD. Pumping light from the forward-pumping light source 3 and the backward-pumping light source 4 is directed to the EDF 1 via the associated WDM couplers 5 and 6, respectively. The pumping light sources 3 and 4 have variable output powers in response to control signals, respectively.

To the optical coupler 10 is connected the photo-diode 11 for extracting a part of the input signal light and detecting the power thereof. Similarly, a photo-diode 14 is connected to the optical coupler 13 in order to extract a part of the output signal light and then detect a power thereof. Moreover, the temperature detector 9 is disposed in the vicinity of the EDF 1 for detecting the environmental temperature of the EDF 1. Information about the detected powers of the input signal light and output signal light and information about the detected environmental temperature are sent to the control circuit 2.

The control circuit 2 calculates a gain based on the powers of the input and output signal light and then compares the calculated gain with a predetermined gain for allowing the gain deviation to be minimized for the input condition and the environmental temperature. The control circuit 2 then controls the pumping light source 4, and the pumping light source 3, if necessary, so as to supply optimum pumping light powers to the EDF 1.

Embodiment 4

In the first through third embodiments, the structures in which the gain deviation can be changed in response to not only the change in the power of the input light but also the change in the environmental change of the EDF 1 are described. However, if the environmental temperature of the EDF 1 is kept constant, the gain deviation is changed only depending on the power of the input light, resulting in simplification of the control for the pumping light power.

Figure 25:
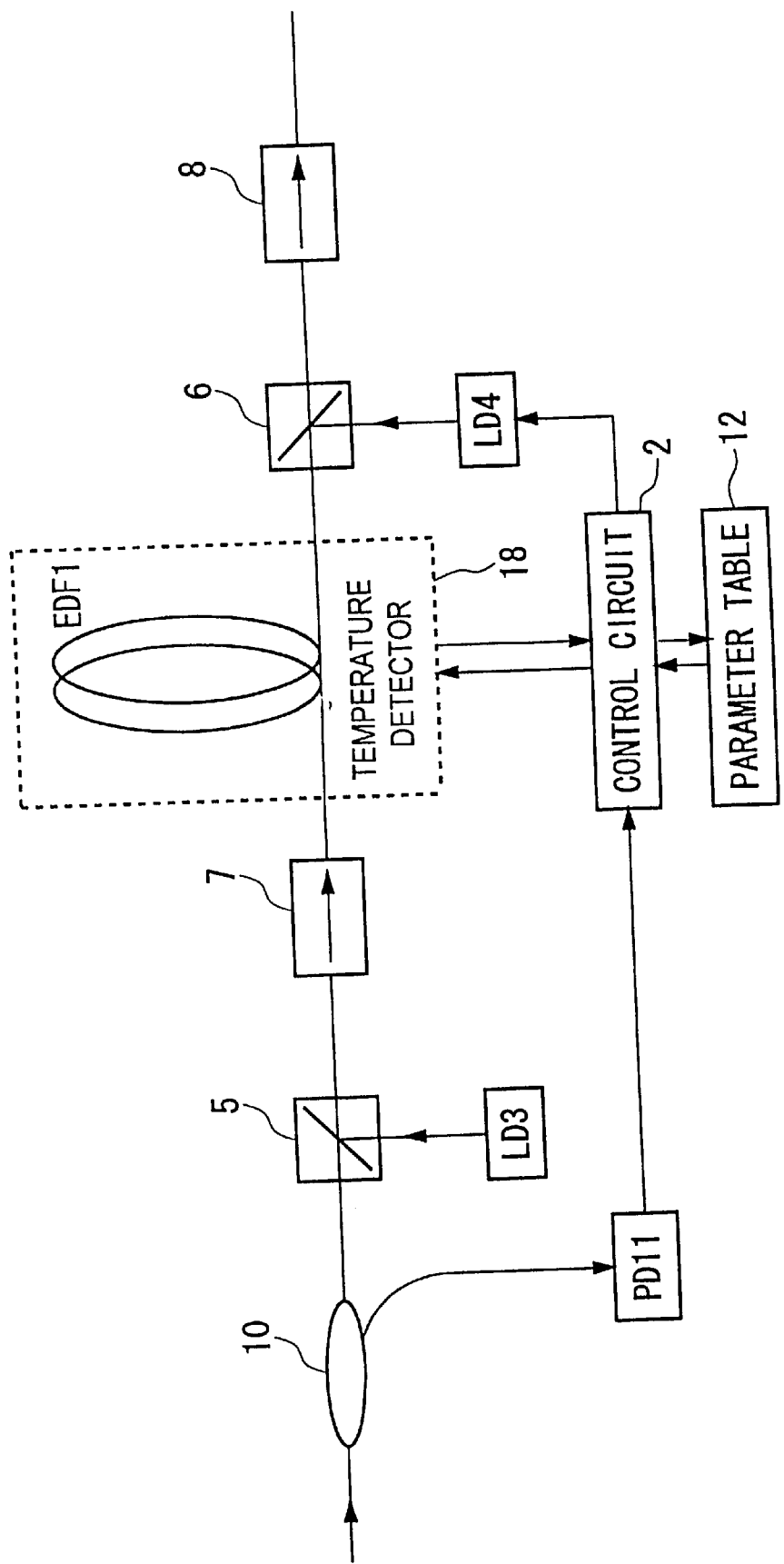
FIG. 25 schematically shows a structure of the bidirectional-pumping L-band EDFA according to a fourth embodiment of the present invention.

The fourth embodiment applies this idea to the first embodiment. FIG. 25 shows a schematic structure of an L-band EDFA according to the fourth embodiment of the present invention. In FIG. 25, parts similar to those in the above embodiments are shown with the same reference numerals. As shown in FIG. 25, the L-band EDFA in the present embodiment includes a temperature controller 18, instead of the temperature detector 9. The temperature controller 18 may be composed of a Peltier element, a constant temperature chamber or a radiator. The temperature controller 18 is controlled by the control circuit 2 so as to measure the environmental temperature of the EDF 1 and to keep the environmental temperature a predetermined temperature, 25° C. in the present embodiment.

The control circuit 2 shown in FIG. 25 also includes the parameter table 12. The parameter table 12, however, defines the output power of the backward-pumping light source 4 for minimizing the gain deviation response to the change in the power of the input signal light when the environmental temperature is 25° C., as shown in FIG. 26. In FIG. 26, Pin denotes the power of the input light; T denotes the environmental temperature of the EDF; and Ppump(b) denotes the output of the backward-pumping light source 4.

The control circuit 2 refers to the parameter table 12 based on the detected input signal power, so as to determine an optimum output power of the backward-pumping light source 4. Then, the control circuit 2 sends out a control signal corresponding to the determined optimum output power to the backward-pumping light source 4.

Consequently, the backward-pumping light source 4 can supply the EDF 1 with the optimum output power that minimize the gain deviation for the detected input signal power at the predetermined environmental temperature.

Embodiment 5

Figure 27:
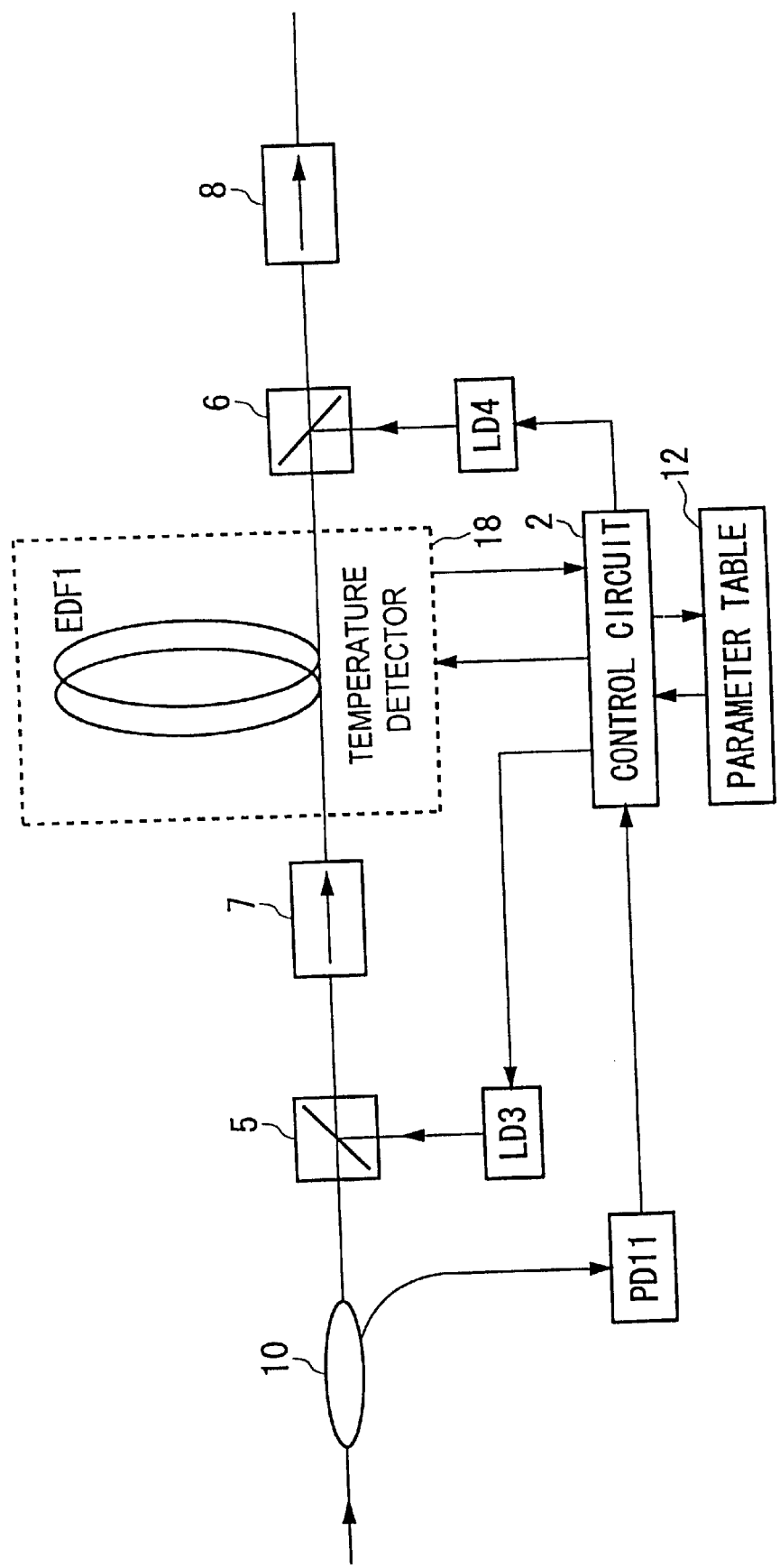
FIG. 27 schematically shows a structure of the bidirectional-pumping L-band EDFA according to a fifth embodiment of the present invention.

FIG. 27 schematically shows a structure of an L-band EDFA according to the fifth embodiment of the present invention. In FIG. 27, parts similar to those in the aforementioned embodiments are shown with the same reference numerals. The structure shown in FIG. 27 is similar to that in the second embodiment but includes, instead of the temperature detector, the temperature controller 18 described in the fourth embodiment. The temperature controller 18 is set to keep the environmental temperature of the EDF 1 a predetermined temperature.

The control circuit 2 shown in FIG. 27 also includes the parameter table 12. The parameter table 12 defines the output powers of the backward-pumping light source 4 for minimizing the gain deviation that respectively correspond to various powers of the input light at the predetermined environmental temperature.

The control circuit 2 refers to the parameter table 12 based on the detected input signal power, and then determines the optimum output powers of the forward-pumping light source 3 and the backward-pumping light source 4, so as to send out control signals corresponding to the determined output powers to the forward-pumping light source 3 and the backward-pumping light source 4, respectively.

Consequently, the forward-pumping light source 3 and the backward-pumping light source 4 can supply the EDF 1 with the optimum output powers that enable the minimum gain deviation for the detected input signal power at the predetermined environmental temperature.

Embodiment 6

Figure 28:
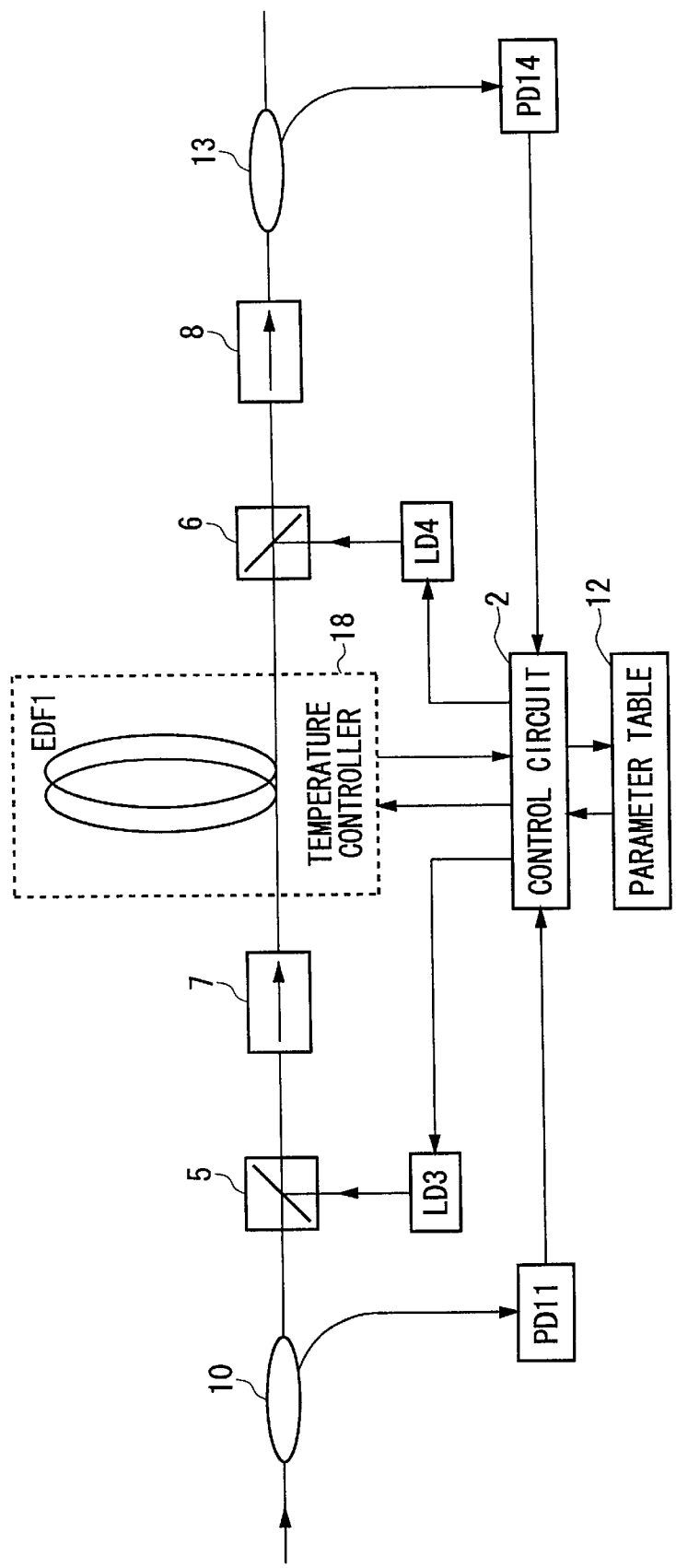
FIG. 28 schematically shows a structure of the bidirectional-pumping L-band EDFA according to a sixth embodiment of the present invention.

FIG. 28 schematically shows a structure of an L-band EDFA according to the sixth embodiment of the present invention. In FIG. 28, parts similar to those in the aforementioned embodiments are shown with the same reference numerals. The structure shown in FIG. 28 is similar to that in the third embodiment but includes, instead of the temperature detector, the temperature controller 18 described in the fourth embodiment. The temperature controller 18 is set to keep the environmental temperature of the EDF 1 a predetermined temperature.

The control circuit 2 shown in FIG. 28 calculates the gain based on the input power and the output power and then compares the calculated gain with the predetermined gain that minimizes the gain deviation for an input condition and an environmental temperature that are found in advance. Then, the control circuit 2 controls the output power of the backward-pumping light source 4, and that of the forward-pumping light source 3, if necessary, so that the optimum power(s) of pumping light is supplied to the EDF 1.

Embodiment 7

In the first through sixth embodiments described above, the power of the input signal light is detected. Alternatively, the gain deviation can be compensated by detecting the gain deviation in the output light and then changing the output power of the backward-pumping light source so as to cancel the detected gain deviation.

Figure 29:
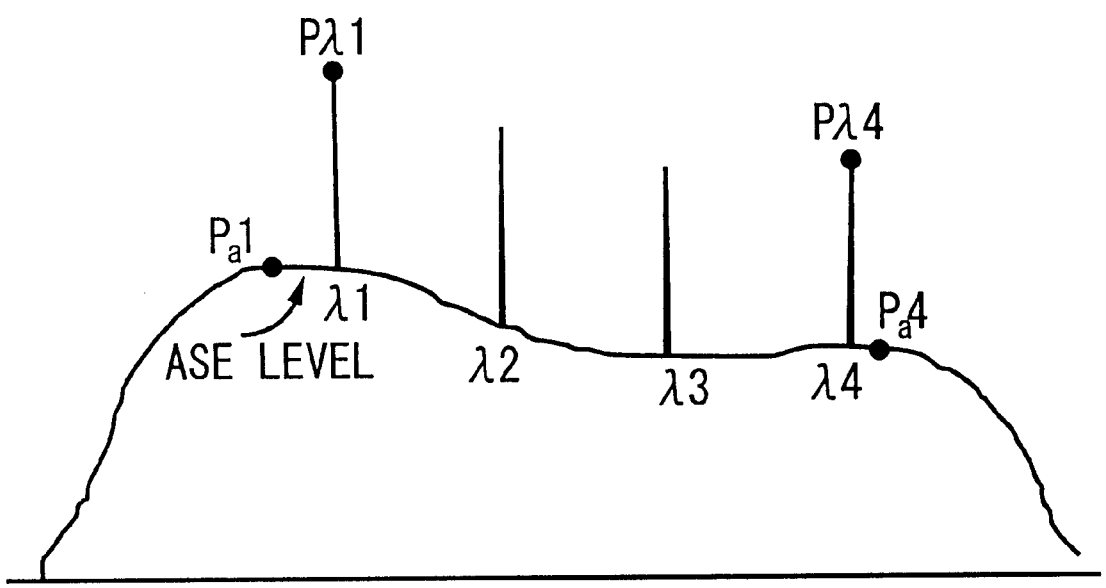
FIG. 29 illustrates two points included in output light at which output powers are detected in a seventh embodiment of the present invention.

The gain deviation in the output light is easily calculated by detecting output powers at two points included in the output light that have different wavelengths in the long-wavelength band, for example, output powers $P\lambda 1$ and $P\lambda 4$ of signal light beams $\lambda 1$ and $\lambda 4$ among a plurality of signal light beams $\lambda 1, \lambda 2, \lambda 3$ and $\lambda 4$, or by detecting output powers Pa1 and Pa4 of amplified spontaneous emission (hereinafter, simply referred to as "ASE") component in the vicinity of the plurality of signal light beams, as shown in FIG. 29.

Figure 30:
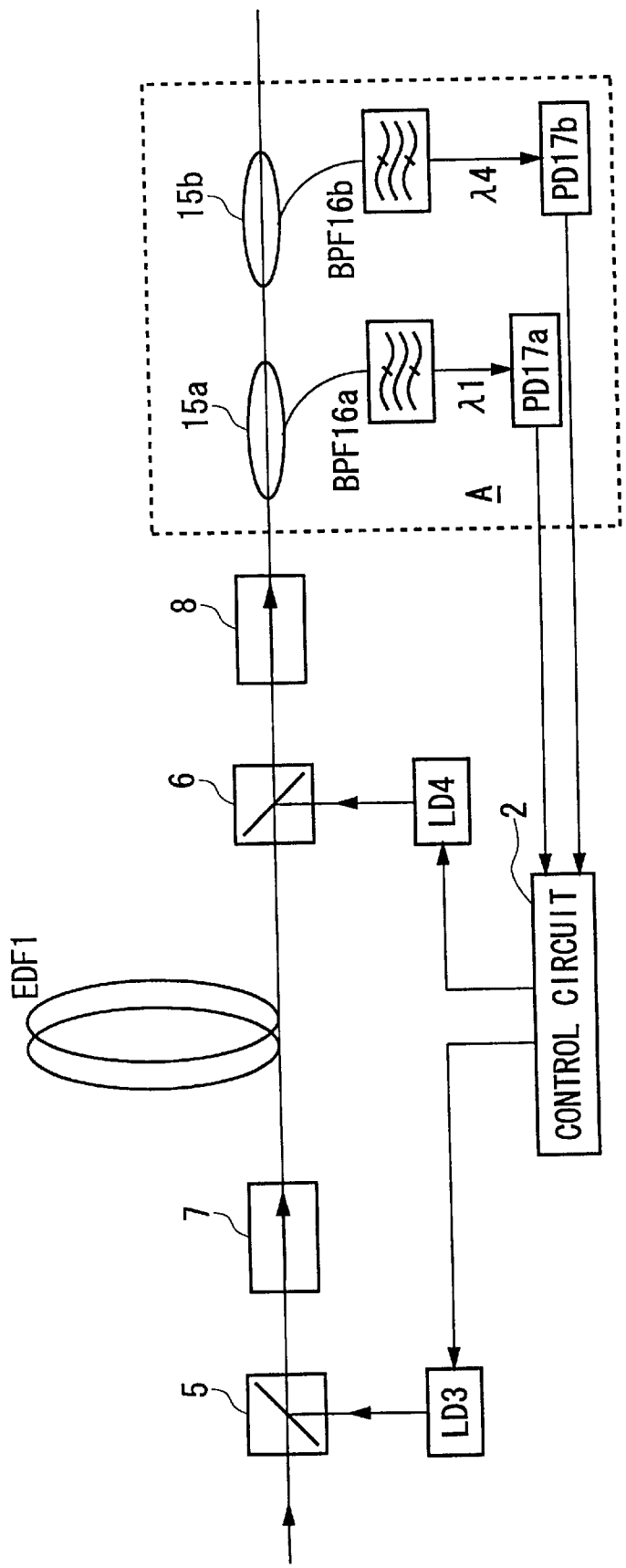
FIG. 30 schematically shows a structure of a bidirectional-pumping L-band EDFA according to the seventh embodiment.

FIG. 30 schematically shows a structure of an L-band EDFA according to the seventh embodiment of the present invention, which detects the gain deviation in the output light so as to compensate the gain deviation. In FIG. 30, parts similar to those in the aforementioned embodiments are shown with the same reference numerals.

The L-band EDFA includes the WDM coupler 5 having wavelength-selectivity, the isolator 7, the EDF 1, the WDM coupler 6 having wavelength-selectivity, the isolator 8 and optical couplers 15a and 15b that are disposed on the path of the signal light in that order from the light incident side.

To the WDM coupler 5 is connected the forward-pumping light source 3 composed of an LD. Similarly, to the WDM coupler 6 is connected the backward-pumping light source 4 composed of an LD. Pumping light output from the pumping light sources 3 and 4 is supplied to the EDF 1 via the associated WDM couplers 5 and 6, respectively.

The pumping light sources 3 and 4 have output powers variable based on control signals, respectively.

Output signal light extracted from the optical coupler 15a is supplied to a band-pass filter (BPF) 16a that allows only a light component having a wavelength $\lambda 1$ to pass therethrough. Thus, the BPF 16a extracts a part of the output signal light. A PD 17a then detects an output power $P\lambda 1$ of the extracted output light component.

Similarly, output signal light extracted from the optical coupler 15b is supplied to another BPF 16b that allows only a light component having a wavelength $\lambda 4$ to pass therethrough. Thus, the BPF 16b extracts a part of the output signal light. Then, a PD 17b detects an output power $P\lambda 4$ of the extracted output light component.

The detected powers $P\lambda 1$ and $P\lambda 4$ are input to the control circuit 2. The control circuit 2 controls the pumping power of the backward-pumping light source 4, and that of the forward-pumping light source 3, if necessary, to be optimum power(s), using the power $P\lambda 1$ of the output light component having a longer wavelength as a reference power, so as to make the power $P\lambda 4$ of the other output light component substantially the same as the power $P\lambda 1$.

As is apparent from the above, an output-light-deviation detector A is composed of the optical couplers 15a and 15b, the BPFs 16a and 16b and the PDs 17a and 17b in the present embodiment. However, the structure of the output-light-deviation detector A is not limited to the above.

Figure 31:
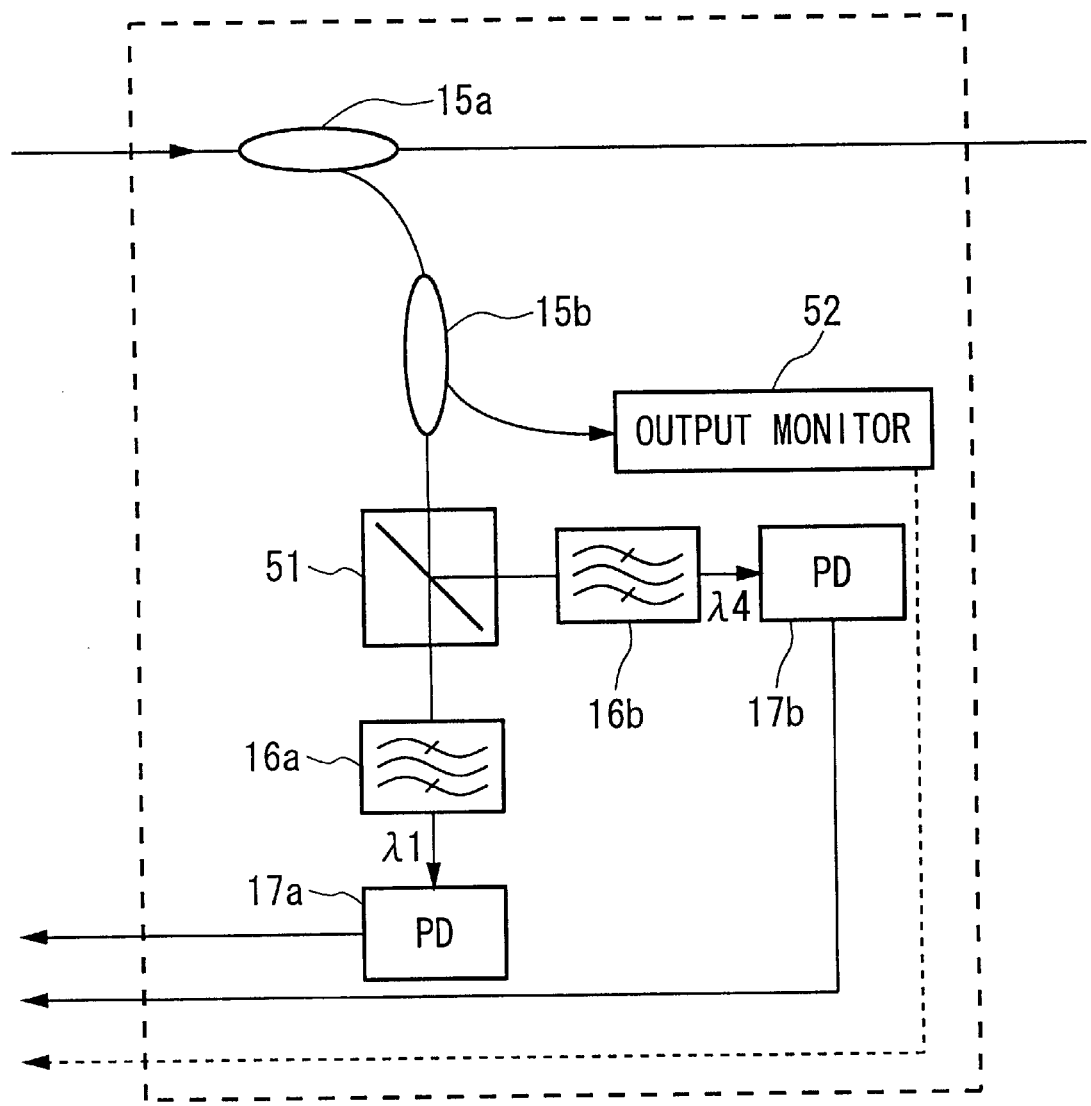
FIG. 31 shows an exemplary structure of an output-deviation detector A in the seventh embodiment in which a beam splitter divides each wavelength component into two and an output monitor is further provided.
Figure 32:
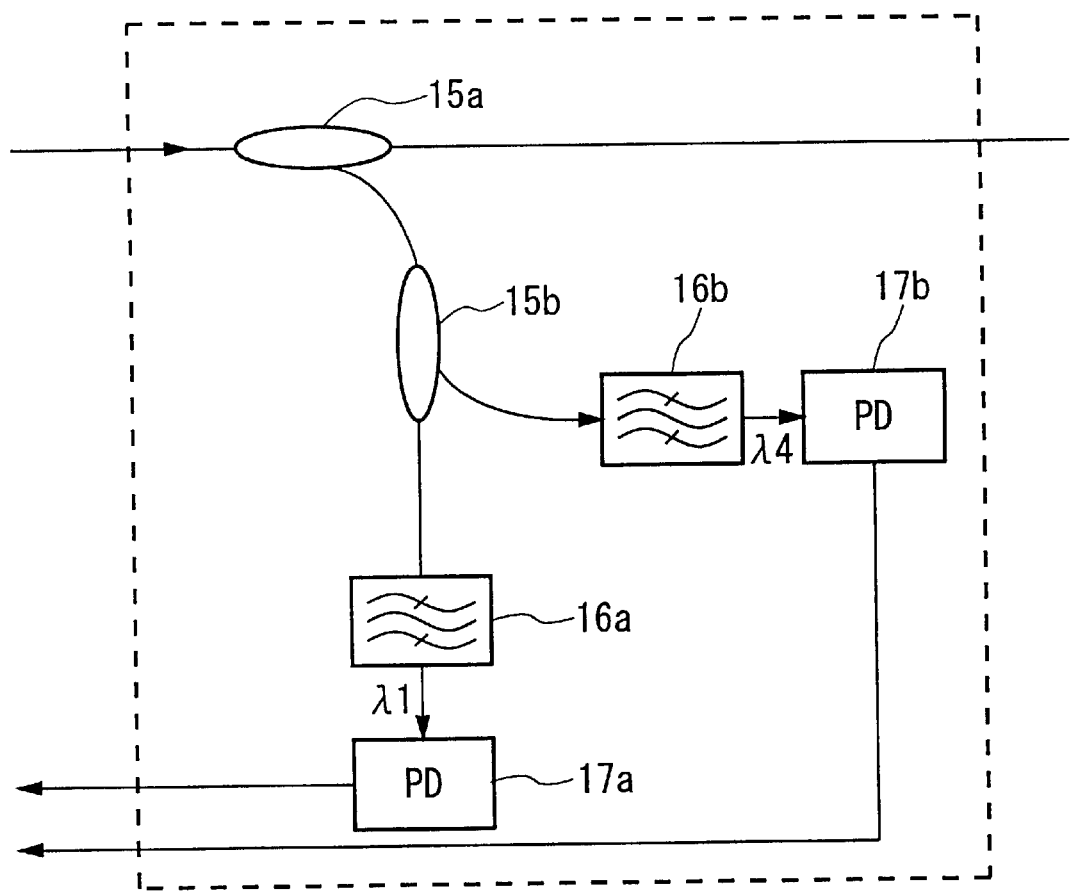
FIG. 32 shows an exemplary structure of an output-deviation detector A in the seventh embodiment in which an optical coupler divides each wavelength component into two and BPFs are provided for extracting the corresponding wavelength component.
Figure 33:
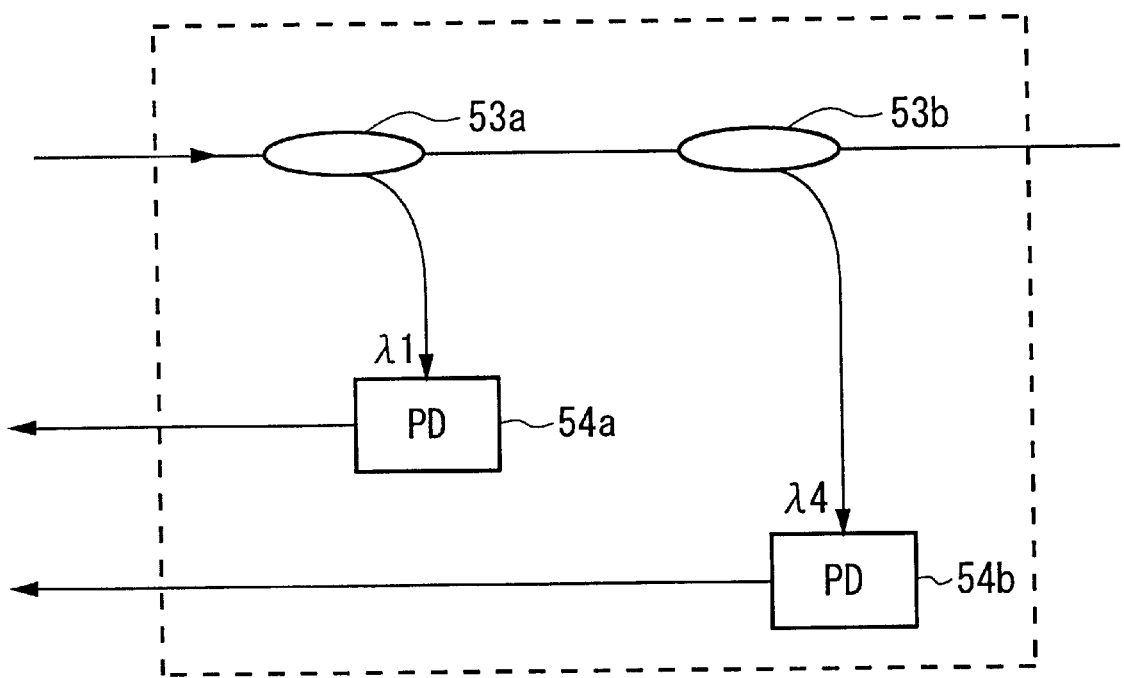
FIG. 33 shows an exemplary structure of an output-light-deviation detector A in the seventh embodiment in which optical couplers having wavelength-selectivity or photo-diodes having wavelength-selectivity are disposed in series with respect to a propagating direction of signal light.
Figure 34:
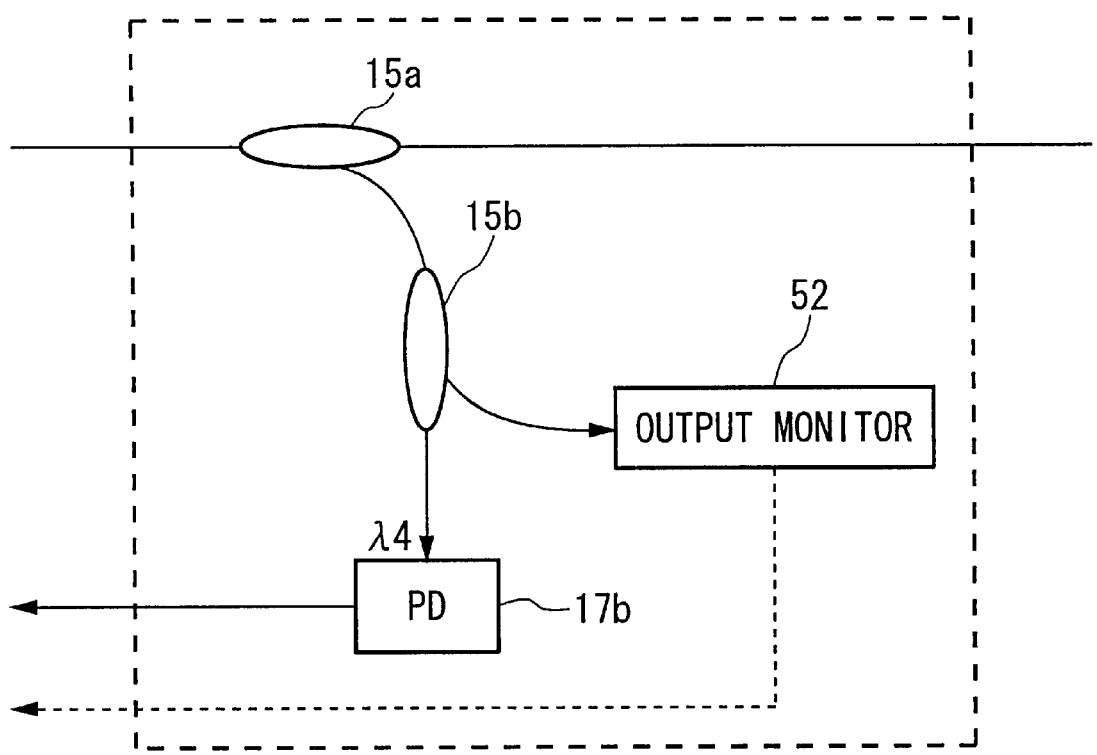
Figure 35:
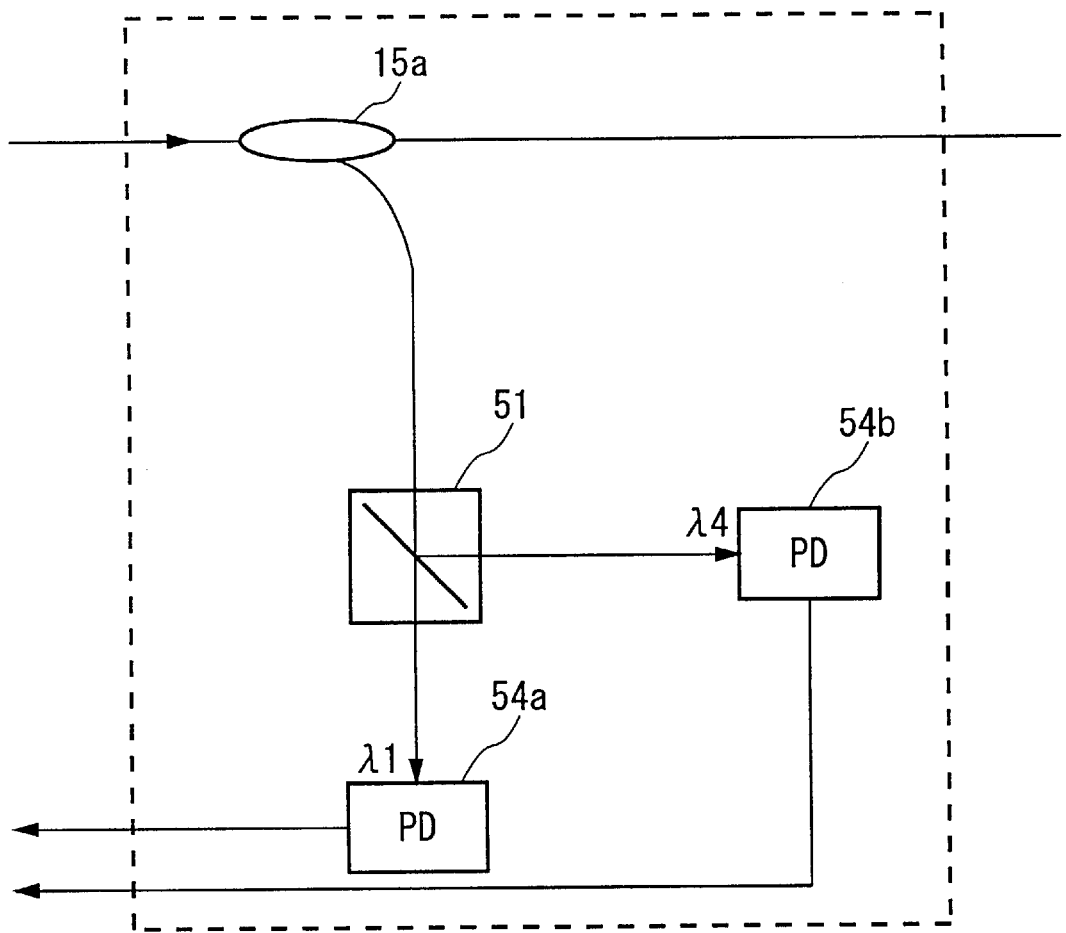
FIG. 35 shows an exemplary structure of an output-light-deviation detector A in the seventh embodiment in which photo-diodes both having wavelength-selectivity are used as light-receiving portions so as to directly receive light.

For example, the output-light-deviation detector may have a structure in which a beam splitter divides each of the output light components into two beams and an output monitor 52 is further provided, as shown in FIG. 31. Alternatively, the output-light-deviation detector may have a structure in which an optical coupler 15b' is provided for dividing the output light component extracted by the optical coupler 15a into two beams, and the BPFs 16a and 16b extract the respective wavelength components, as shown in FIG. 32. Alternatively, the output-light-deviation detector may have a structure in which optical couplers 53a and 53b both having wavelength-selectivity or PDs 54a and 54b both having wavelength-selectivity, that are disposed in series with respect to the propagating direction of the signal light, as shown in FIG. 33. Alternatively, as shown in FIG. 34, the output-light-deviation detector may be constructed by using an output monitor 52 such as a channel monitor or the like, as the light-receiving portions, without using the PD for the light-receiving portion. Alternatively, the output-light-deviation detector may be constructed by PDs 54a and 54b both having wavelength-selectivity as the light-receiving portions, as shown in FIG. 35.

Embodiment 8

Figure 36:
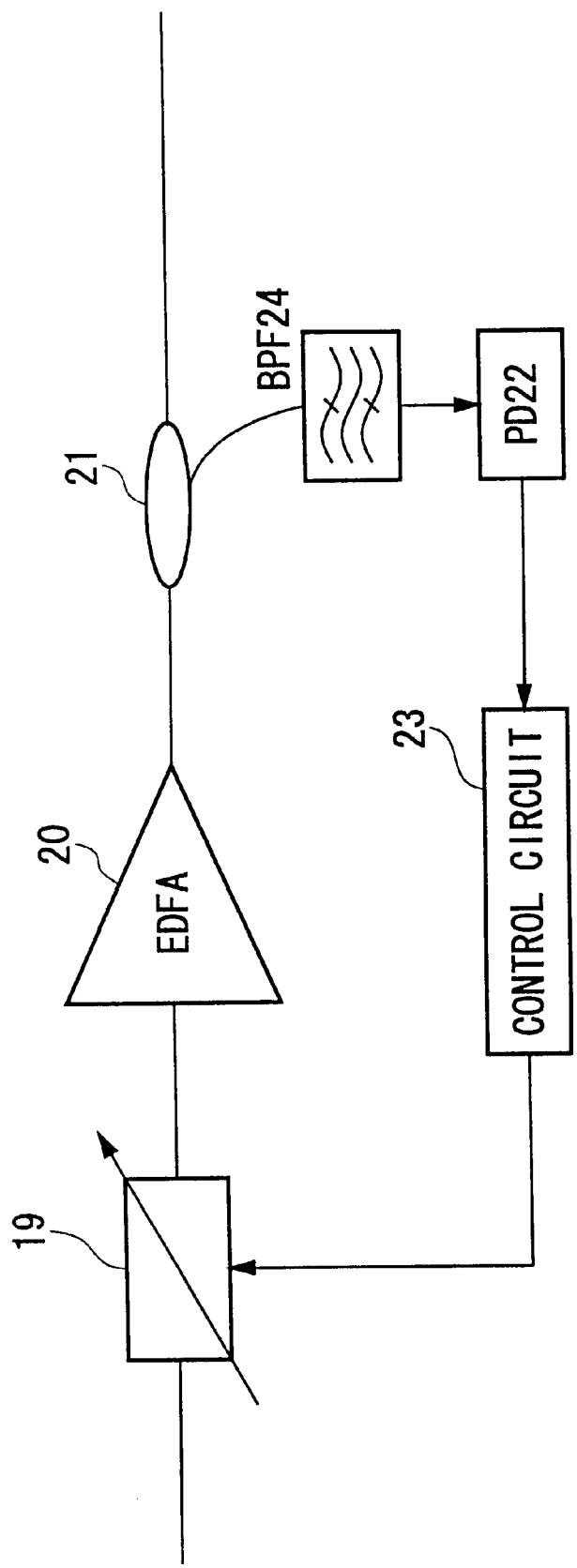
FIG. 36 schematically shows a structure of a bidirectional-pumping L-band EDFA according to an eighth embodiment of the present invention.

Next, a bidirectional-pumping L-band EDFA according to the eighth embodiment of the present invention is described with reference to FIG. 36. FIG. 36 schematically shows a structure of the L-band EDFA according to the present embodiment.

The L-band EDFA in the present embodiment includes a variable optical attenuator 19, an optical fiber amplifier 20 and an optical coupler 21 which divides output signal light that are disposed on a path of signal light in that order from the light incident side. As the optical fiber amplifier 20, the EDFA described in any of the first through seventh embodiments can be incorporated.

A part of the output signal light is divided by the optical coupler 21 passes through a BPF 24 and then is input to a PD 22 which detects a power thereof. Based on the detected result, a control circuit 23 controls the attenuation amount by the variable optical attenuator 19 disposed at the light incident end, so as to provide a constant output power of the L-band EDFA shown in FIG. 36 for any input signal power.

Figure 37:
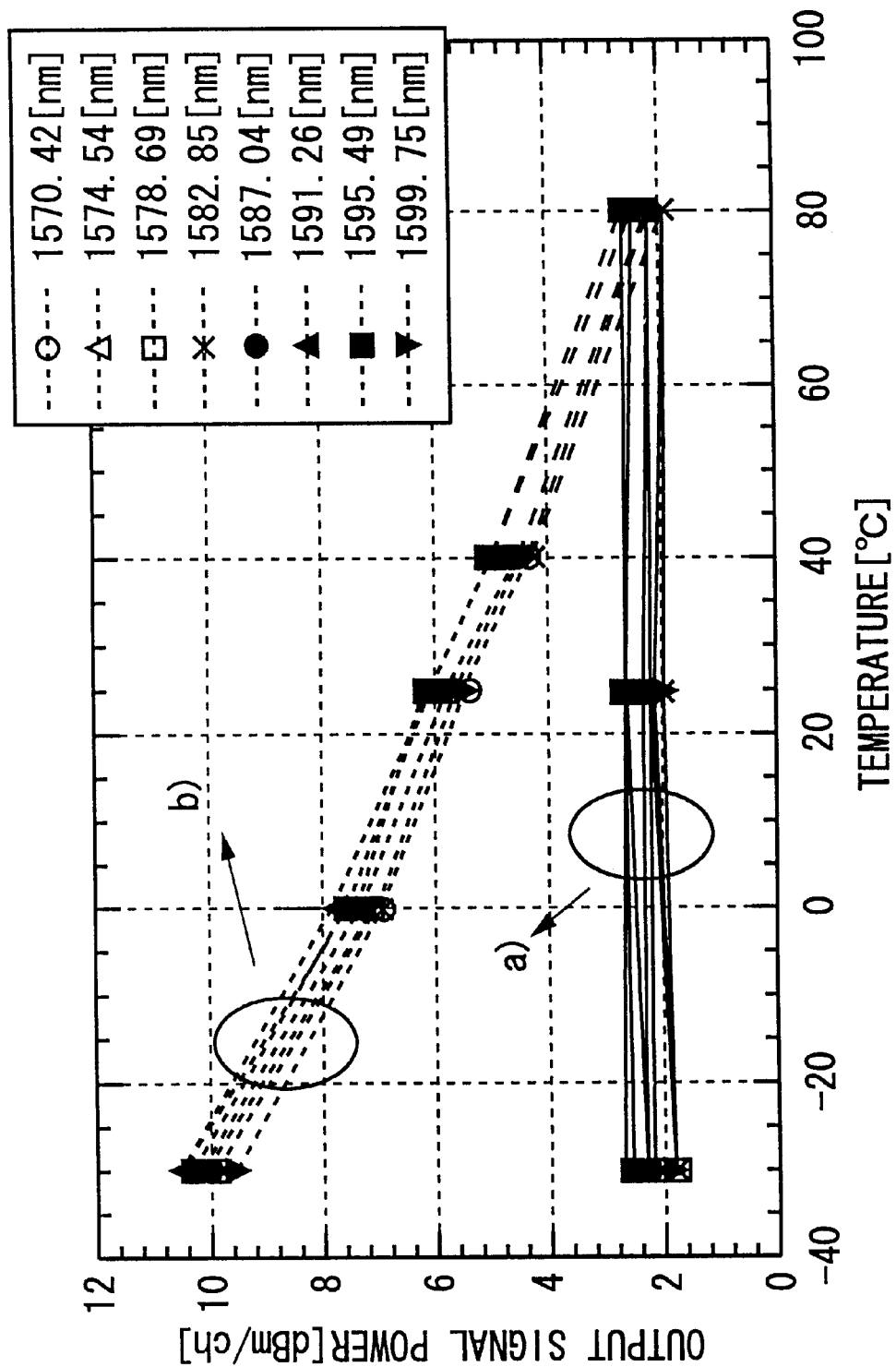
FIG. 37 shows a relationship between an output power and a temperature after a backward pump power is controlled so as to suppress a gain deviation to be 1 dB or less for respective temperatures.

FIG. 37 shows a relationship between the temperature and the output power after the backward pump power is adjusted so as to provide the gain deviation of 1 dB or less at the respective temperatures.

In FIG. 37, Curves b) exhibit exemplary effects obtained in the first through seventh embodiments, in which the gain deviation of 1 dB or less is realized at any temperature. However, the output power is not constant. On the other hand, Curves a) exhibit an exemplary effect obtained in the eighth embodiment. As shown by Curves a), the output power can be controlled to be constant by changing the attenuation amount by the optical attenuator for a target output with use of the structure shown in FIG. 36.

The present invention is applied to an erbium-doped fiber which amplifies light in the long wavelength band, currently. However, the application of the present invention is not limited to the erbium-doped fiber. The present invention can also be applied to an optical amplifier and enables the gain thereof to be flattened, as long as the optical amplifier incorporates a stimulated emission medium that provides wavelength-dependent outputs in the forward-pumping and the backward-pumping of which tendencies are different from each other, as in the erbium-doped fiber.

It should be noted that the temperature controller 18 can be set to keep any desired temperature considering the surroundings of the EDFA, although the temperature controller 18 in the fourth through sixth embodiments is set to keep the environmental temperature of the EDFA 25° C.

In addition, the temperature controller 18 is controlled to keep a predetermined single environmental temperature and the parameter table only defines the output power at the predetermined environmental temperature in the fourth through sixth embodiments. However, the temperature controller can be controlled to select one of a plurality of environmental temperatures. For example, the environmental temperature may be changed in the first through third embodiments. In this case, in order to make a precise control in response to the change in the environmental temperature, the parameter table is required to define numerous output powers for all of the possible environmental temperatures.

However, the parameter table may be made to define the output power for every 5 degrees. In this case, the temperature controller measures the environmental temperature of the EDF and then cools or heats the temperature so as to be equal to the nearest one of the environmental temperatures stored in the parameter table. More specifically, the parameter table was prepared to define the output powers at the environmental temperature of 10° C., 15° C., 20° C. and 25° C., for example. If a measured environmental temperature is 21° C., the temperature controller controls the environmental temperature of the EDF to be 20° C. Such a structure enables the precise compensation of the gain deviation by the minimum temperature control using a relatively smaller-sized parameter table.

Moreover, connections between the optical couplers and the isolators in the aforementioned embodiments are a typical example of the connections in the bidirectional-pumping EDFA. It should be noted that the present invention can be applied to another structure in which the optical couplers and the isolators are connected in the opposite order.

In addition, although the structure including a single L-band EDFA is described in the aforementioned embodiments, the present invention can be applied to a multiple L-band EDFA.

Furthermore, in the aforementioned embodiments, each of the forward-pumping light source and the backward-pumping light source is composed of a single LD. However, each pumping light source can adopt a structure for supplying pumping light that have been subjected to synthesization of polarized wave or wavelength multiplexing.

Embodiment 9

The aforementioned embodiments are related to the suppression of the gain deviation in the L-band EDFA. The suppression of the gain deviation is, however, a common problem to the L-band and C-band EDFAs. Next, a structure of an optical fiber amplifier which is applicable both to the L-band EDFA and C-band EDFA for the purpose of suppressing the gain deviation and a control method therefor are described.

As described above, the amount and the tendency of the gain deviation are changed depending on conditional changes, such as the change of the input signal light (and the temperature). This makes the control for suppressing the gain deviation complicated.

In other words, if the change in the operational condition, such as the change of the input signal light power (and the temperature change) can be prevented, it is relatively easy to prevent or suppress the occurrence of the gain deviation within a range allowable for an optical transmission system under a specific operational condition. Then, when a plurality of signal light beams having a deviation in a predetermined range (and having an S/N ratio in a predetermined range) are supplied to the optical fiber amplifier under this specific operational condition, the deviation of the signal light beams output from the optical fiber amplifier can also be suppressed within the allowable range for the optical transmission system.

Such an operational condition cannot be uniquely determined because of differences between the characteristics of an amplifying medium used in the optical fiber amplifier. Some publications, however, disclose the existence of such an operational condition, for example, Japanese Laid-Open Patent Publications Nos. 07-193542 and 09-153865.

In these publications, a structure is disclosed in which the power of the input signal light input to the EDFA and the power of the output signal light output from the EDFA are compared with each other and the power of the pumping light of the EDFA is then adjusted so as to have the EDFA to have a predetermined amplification factor irrespective of the power of the input signal light. By adopting this structure, the above-mentioned specific operational condition can be maintained.

In this structure, it is important to precisely find the condition of the output signal light in order to flatten the gain. However, the output from the optical fiber amplifier having a typical structure, however, includes not only the amplified output signal light but also the ASE component that serves as noise.

Figure 38:
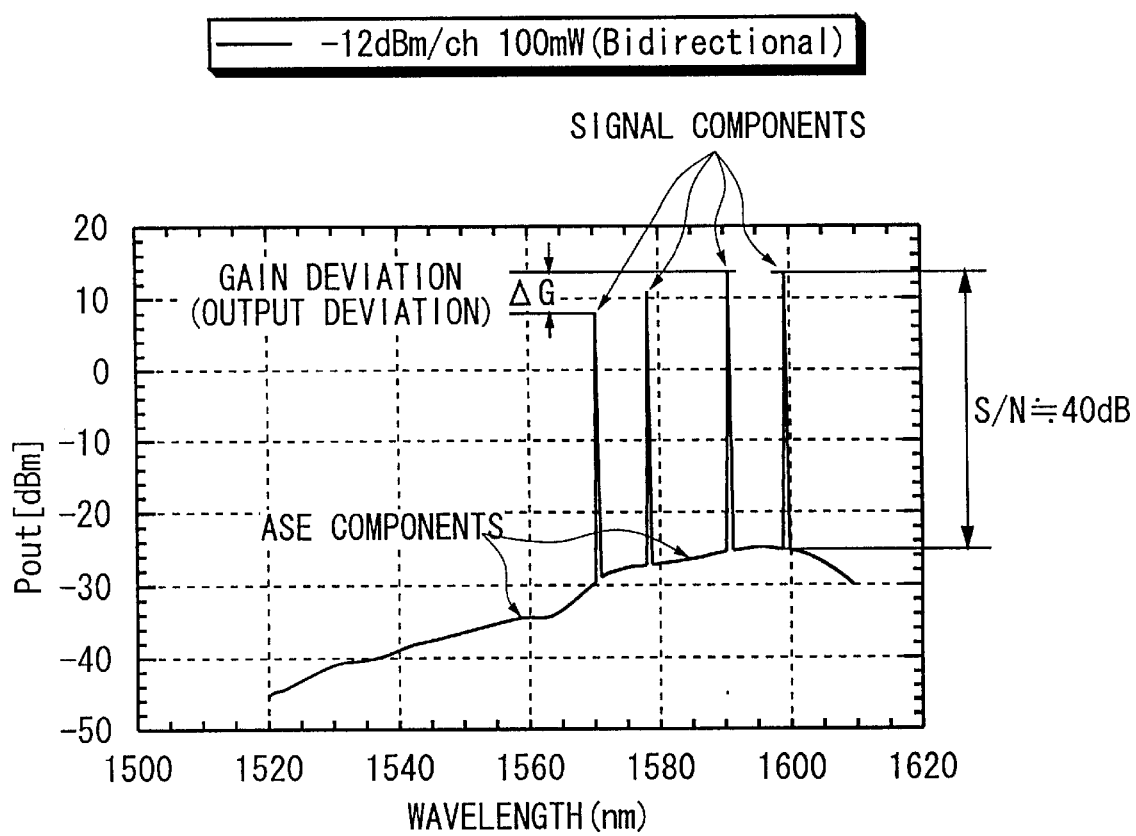
FIG. 38 shows a measurement result in a case where input signal light having a power of is −12 dBm/ch is directed to a bidirectional-pumping EDFA in which 100 mW of pumping light is supplied from each of front and rear directions.
Figure 39:
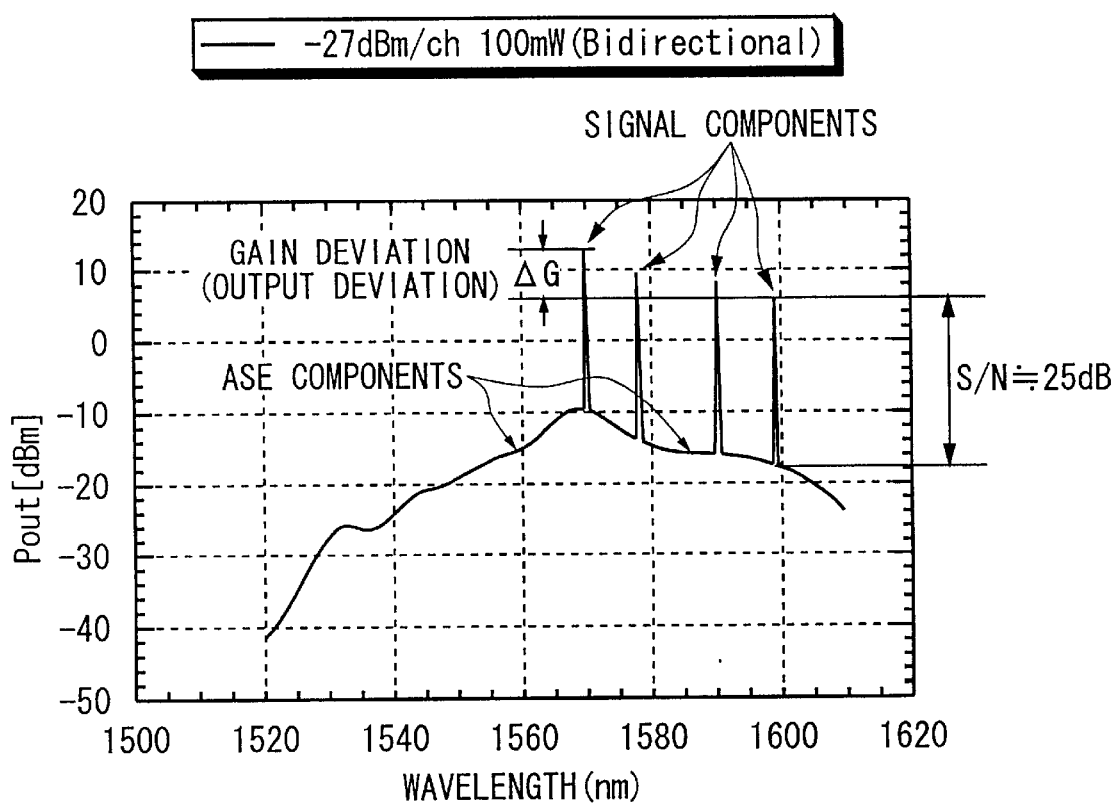
FIG. 39 shows a measurement result in a case where input signal light having a power of is −27 dBm/ch is directed to the bidirectional-pumping EDFA in which 100 mW of pumping light is supplied from each of the front and rear directions.

A relationship between the power level of the input signal light and that of the ASE component is varied depending on the power of the input signal light, as shown in FIGS. 38 and 39. FIGS. 38 and 39 show results of measurements using the bidirectional-pumping EDFA in which pumping light of 100 mW is supplied from each of the front and rear directions. FIG. 38 shows the measurement result in the case where the power of the input signal light is −12 dBm/ch while FIG. 39 shows the measurement result in the case of −27 dBm/ch. It is apparent from FIGS. 38 and 39 that the power of the ASE component is higher in the measurement of FIG. 39 than that in the measurement of FIG. 38. This is because a part of the power supplied from the pumping light source to the amplifying medium such as the EDF, that is not used for the amplification of the signal light, is used for amplifying an energy stored in the ASE and then the unused energy turns into the ASE.

The S/N ratio becomes smaller as the power of the input signal light is lower, as shown in FIGS. 38 and 39, where the S/N ratio is defined as a ratio of the signal and the ASE component that serves as the noise. Consequently, it becomes difficult to separate the signal component from the ASE component. It should be noted that the power of the ASE component may become higher than that of the signal light under some input conditions.

The power of the input signal light input to the optical fiber amplifier, that is to be subjected to the amplification, is low, in general. Thus, when the low-power input signal light is input to the EDFA, the ASE component becomes higher, as described above. In this case, the output from the optical fiber amplifier is composed of the signal light component and the ASE component that has a high power. Under some operational conditions, the power of the ASE component becomes higher than that of the signal light component.

In order to precisely find the condition of the output signal light under such conditions, the output signal light has to be separated from the ASE component. Thus, it is insufficient to monitor only the power of the whole output from the optical fiber amplifier.

Figure 40:
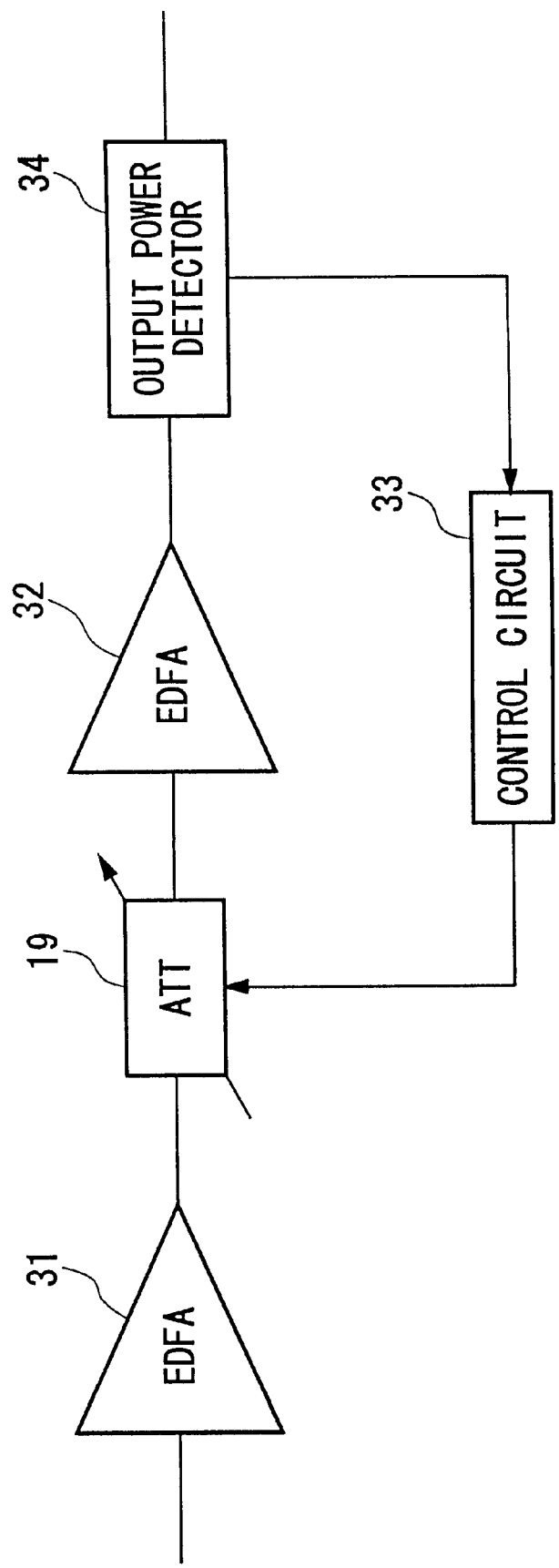
FIG. 40 schematically shows a structure of an optical fiber amplifier according to a ninth embodiment of the present invention.

For this reason, according to the above-mentioned conventional technique, for the purpose of flattening the gain of the EDFA, a function for separating the output signal light from the ASE component, for example, monitoring an output spectrum, is required as a means for monitoring the power of the output signal in order to recognize the flatness of the gain. In an alternative case, the output signal light component may be estimated based on the ASE component because it is impossible to directly monitor the output signal light component only. In the ninth embodiment of the present invention, the aforementioned conventional technique is improved with regard to these points. A structure of an optical fiber amplifier in the ninth embodiment is shown in FIG. 40. In FIG. 40, parts similar to those in the aforementioned embodiments are shown with the same reference numerals.

Figure 41:
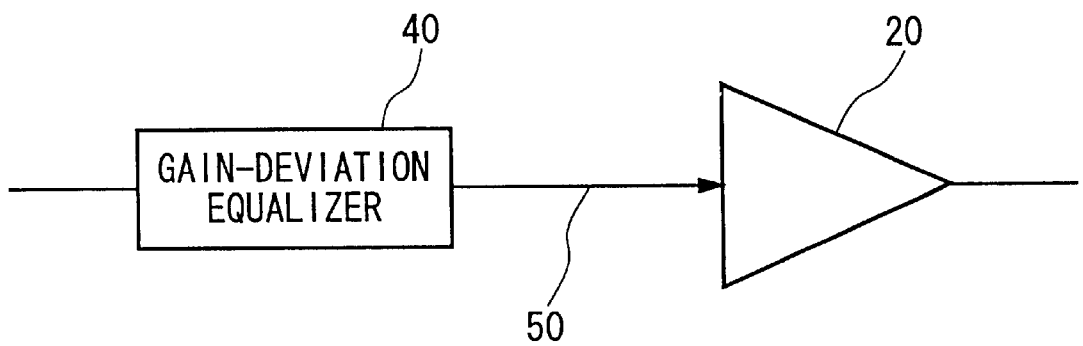
FIG. 41 schematically shows a structure of an optical transmission system incorporating the optical fiber amplifier according to the ninth embodiment.

FIG. 41 is a schematic view of an optical transmission system adopting the present embodiment. In the optical transmission system, on an upstream side of an optical fiber amplifier 20 to which the present embodiment is applied, a gain-deviation equalizer 40 that compensates a plurality of signal light beams to have the deviation within a predetermined deviation range (and the S/N ratio within a predetermined S/N-ratio range) is provided so as to be connected to the optical fiber amplifier 20 via an optical fiber transmission path 50. Please note that the gain-deviation equalizer 40 can be implemented by a relay using the optical fiber amplifier described in any of the aforementioned embodiments of the present application or a transmitter which can suppress the gain deviation by controlling the powers of the signal light beams having the different wavelengths independently of each other, for example.

Returning to FIG. 40, the optical fiber amplifier in the present embodiment includes a pre-amplifier 31 serving as the first optical fiber amplifying portion and a booster amplifier 32 serving as the second optical fiber amplifying portion that are connected in that order and that are capable of amplifying and outputting a plurality of signal light beams having different wavelengths. With this structure, the optical fiber amplifier as shown in FIG. 40 performs the double amplification. Each of the pre-amplifier 31 and the booster amplifier 32 is implemented by the EDFA.

Between the pre-amplifier 31 and the booster amplifier 32, the variable optical attenuator 19 in which the attenuation amount can be varied based on a control signal is provided for the purpose of attenuating the output signal from the pre-amplifier 31. A range within which the attenuation amount by the variable optical attenuator 19 is varied approximately corresponds to an input dynamic range of the power of the input signal light input to the pre-amplifier 31. In addition, the operational condition of the optical fiber amplifier is designed so as to minimize the attenuation amount by the variable optical attenuator 19 when the input signal light has possible lowest power.

Moreover, on the output side of the booster amplifier 32, an output-light-power detector 34 is provided which extracts a part (at a predetermined ratio) of the output light of the booster amplifier 32 by means of an optical coupler (not shown) and then detects the power of the extracted light by means of a PD (not shown). Furthermore, a band-pass filter that allows the above-mentioned plurality of signal light beams to pass therethrough is further provided on the output side of the booster-amplifier 32, although it is not shown. The output-light-power detector 34 detects the power of the output light having wavelengths in the band of the above-mentioned plurality of signal light beams.

Information about the power of the output light detected by the output-light-power detecting means 34 is sent to the control circuit 33. The control circuit 33 generates the control signal to be supplied to the variable optical attenuator 19 based on the information about the power of the output light.

Next, an operation of the optical fiber amplifier in the present embodiment is described. First, the gain-deviation equalizer 40 that is connected in the upstream side of the optical fiber transmission path 50, as shown in FIG. 41, supplies the plurality of signal light beams that have been compensated to have the deviation in the predetermined deviation range (and the S/N ratio within the predetermined S/N-ratio range) to the pre-amplifier 31. The pre-amplifier 31 amplifies the signal light beams by about 20 to 30 dB (100 to 1000 times) and then outputs amplified signal light beams.

At this time, the power level of the signal light input to the pre-amplifier 31 is relatively low. Thus, it is hard to separate the signal light component from the ASE component because a difference between the powers of the signal light component and the ASE component in the output light from the pre-amplifier 31 is not large, as indicated by the relationship between the power levels of the input signal light and the ASE component shown in FIGS. 38 and 39.

Then, the output light from the pre-amplifier 31 is input to the booster amplifier 32 via the variable optical attenuator 19. The signal light input to the booster amplifier 32 is amplified as in the pre-amplifier 31. However, the power of the input signal light input to the booster amplifier 32 is sufficiently high unlike the input to the pre-amplifier 31 and therefore the ASE component in the output light from the booster amplifier 32 becomes low as described above. Accordingly, the ASE component can be reduced to a level where the power of the ASE component can be ignored with respect to the power of the signal light.

The output light, in which the ASE component can be reduced to the level where the ASE component can be ignored in view of the power level of the whole output light, is subjected to the power detection by the output-light-power detector 34. The detection result is sent to the control circuit 33.

The control circuit 33 controls the variable optical attenuator 19 by issuing the control signal in such a manner that the detected output signal power falls within a fixed range around a target value that corresponds to the operational condition under which there is no gain deviation in the optical fiber amplifier. Basically, as the attenuation amount by the variable optical attenuator 19 becomes larger, the power of the output light becomes lower; whereas the power of the output light becomes higher as the attenuation amount by the variable optical attenuator 19 becomes smaller. Therefore, the control for the variable optical attenuator 19 by the control circuit 33 can be realized by a feedback control easily.

In order to detect the gain deviation, the precise power of the signal light component included in the output light of the optical fiber amplifier is required. In the present embodiment, the ASE component included in the output light from the optical fiber amplifier can be reduced to the level where the ASE component can be ignored with respect to the signal light component because of the structure using two optical fiber amplifiers, i.e., the structure in which the pre-amplifier 31 is provided before the variable optical attenuator 19. Therefore, the power of the output light from the booster amplifier 32 is dominated by the signal light component. This means that it is possible to monitor the signal light component only without separating the signal light component from the ASE component. Accordingly, in the present embodiment, the gain can be flattened with a simple structure. In addition, a noise factor NFtotal of the whole optical fiber amplifier in the present embodiment is expressed as $$NFtotal=NF1+NF2/(G1-L)$$

where gain and a noise factor of the pre-amplifier 31 are G1 and NF1, respectively; gain and a noise factor of the booster amplifier 32 are G2 and NF2, respectively; and the attenuation amount by the variable optical attenuator 19 is L. Therefore, as is apparent from the above expression, reduction in the output of the optical fiber amplifier can be prevented with the structure in the present embodiment.

Furthermore, the variable optical attenuator 19 is controlled based on the power of the output light that has a direct relationship with the operational condition which provides no gain deviation in the optical fiber amplifier. Therefore, compensation for the operation when the environmental temperature is changed in a case of using optical parts having strong wavelength-dependence, such as the EDF, can be realized.

Embodiment 10

Figure 42:
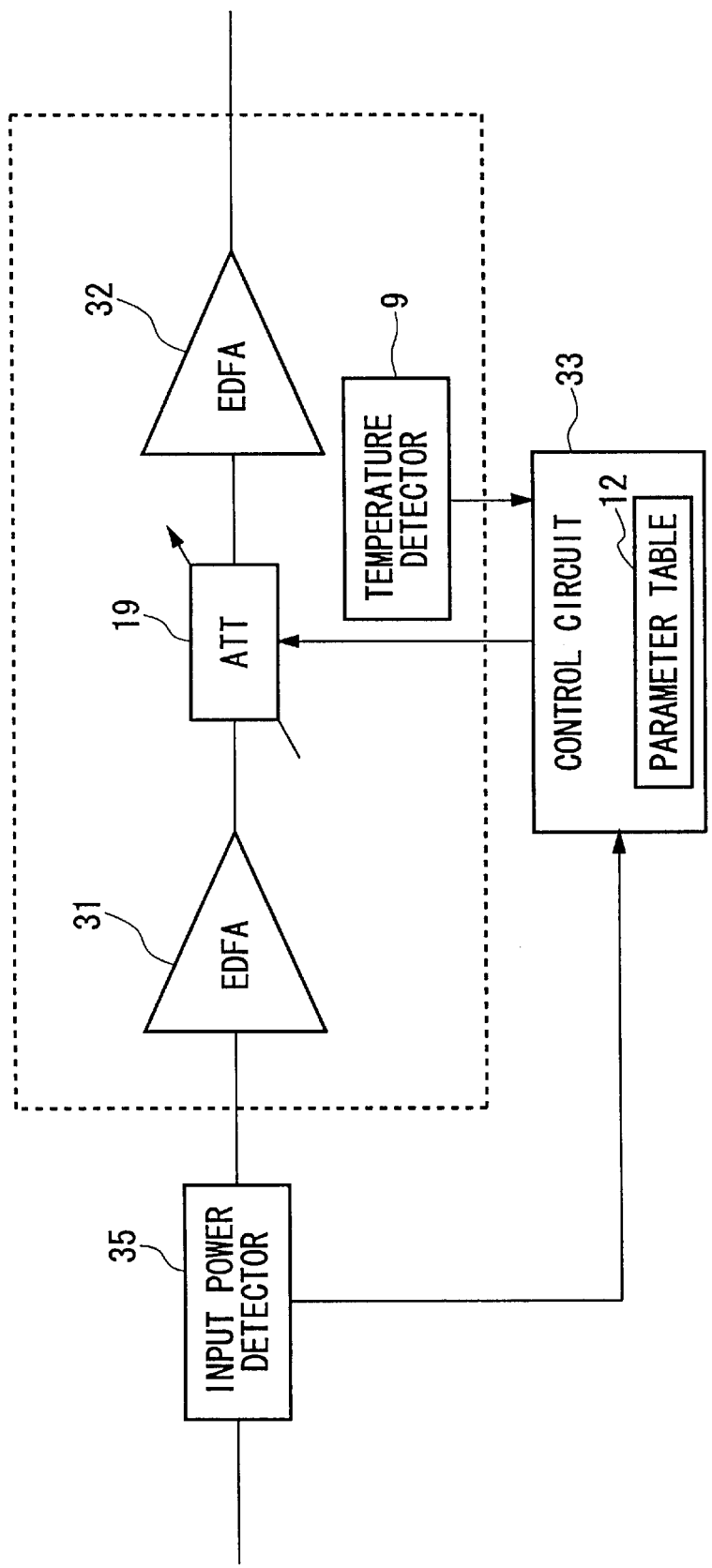
FIG. 42 schematically shows a structure of an optical fiber amplifier to a tenth embodiment of the present invention.

FIG. 42 schematically shows a structure of an optical fiber amplifier according to the tenth embodiment of the present invention. In FIG. 42, parts similar to those in the aforementioned embodiments are shown with the same reference numerals. The optical fiber amplifier in the present embodiment includes the pre-amplifier 31 and the booster amplifier 32 each composed of a typical EDFA, that are connected in that order so as to perform double amplification. Between the pre-amplifier 31 and the booster amplifier 32 is provided the variable optical attenuator 19 in which the attenuation amount can be varied based on the control signal. The range within which the attenuation amount by the variable optical attenuator 19 is varied approximately corresponds to the input dynamic range of the power of the input signal light input to the pre-amplifier 31. The operational condition of the optical fiber amplifier is designed in such a manner that the attenuation amount by the variable optical attenuator 19 is minimized when the input light has a possible lowest power.

On the input side of the pre-amplifier 31, an input-light-power detector 35 is provided which extracts a part (at a predetermined ratio) of the input signal light input to the pre-amplifier 31 by means of an optical coupler (not shown) and then detects the power of the extracted light by means of a PD (not shown). The optical fiber amplifier in the present embodiment further includes the temperature detector 9 for measuring the environmental temperature of the EDF used as each of the pre-amplifier 31 and the booster amplifier 32.

Information about the power of the input signal light detected by the input-light-power detector 35 and information about the environmental temperature detected by the temperature detector 9 are sent to the control circuit 33 having the parameter table 12 stored in a memory.

The parameter table 12 includes a matrix corresponding to both the change of the power of the input signal light and the change of the environmental temperature, as shown in FIG. 43, and defines the attenuation amount by the variable optical attenuator 19 for minimizing the gain deviation for the respective conditions. In FIG. 43, the power of the input signal light is expressed with Pin; the environmental temperature of the EDF is expressed with T; and the attenuation amount by the variable optical attenuator 19 is expressed with ATT attenuation amount. The matrix shown in FIG. 43 is prepared for the control for suppressing the gain deviation to about 1 dB. The control circuit 33 refers to the parameter table 12 based on the detected input signal power and the detected environmental temperature so as to determine the optimum attenuation amount by the variable optical attenuator 19, and thereafter sends the control signal corresponding to the determined attenuation amount to the variable optical attenuator 19.

Figure 44:
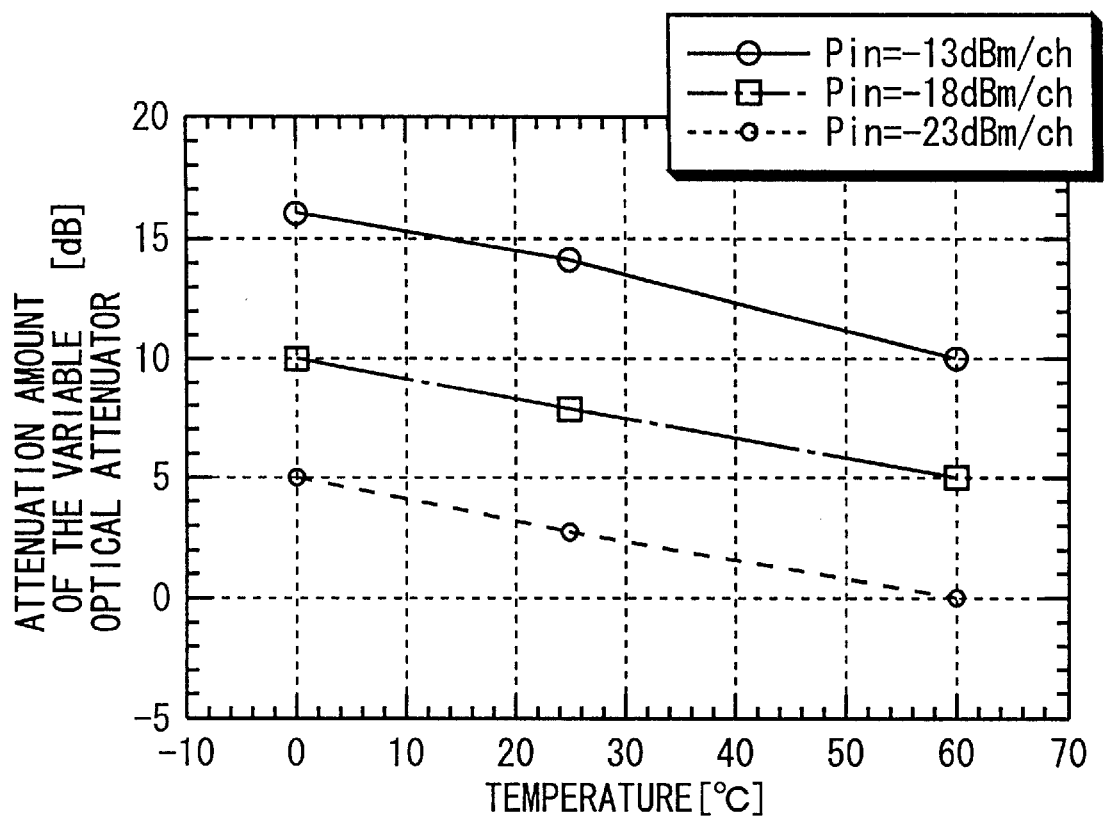
FIG. 44 shows a concept of control for attenuation amount using the parameter table 12 according to the tenth embodiment.

The concept of the control for the attenuation amount by the parameter table 12 is shown in FIG. 44. As is apparent from FIG. 44, in the optical fiber amplifier in the present embodiment, the attenuation amount by the variable optical attenuator is reduced when the environmental temperature increases from atmospheric temperature (25° C.), and is increased when the environmental temperature decreases, while keeping the range in which the attenuation amount is varied the input dynamic range.

Furthermore, in a case where the optical fiber amplifier in the present invention is incorporated into the optical transmission system, the gain deviation of the output signal light output from the optical fiber amplifier can be prevented or suppressed to a level allowable for the optical transmission system, by supplying a plurality of signal light beams having the deviation that has been compensated by means of the gain-deviation equalizer to fall within the predetermined gain range (and having the S/N ratio within the predetermined S/N-ratio range), to the optical fiber amplifier via the transmission path, as in the ninth embodiment.

According to the structure in the present embodiment, the power of the signal light detected by the input-light-power detector 35 actually includes both the powers of the signal attenuated while passing through the transmission path and the noise. However, since the signal light has passed through the gain-deviation equalizer as described above, the sufficient S/N ratio that is a ratio of the signal to the noise is obtained. Thus, the ASE component, that is the noise, is suppressed to a low level at which the noise can be ignored with respect to the signal light. Therefore, it is unnecessary to separate the signal light from the ASE component. For this reason, there arises no practical problem in compensation of the gain deviation even if the parameter table shown in FIG. 43, that has been prepared based on operations in a case of pre-experiments using an optical fiber amplifier alone is used.

In addition, according to the present embodiment, it is possible to compensate the gain deviation by the input-power-detector having a quite simple structure while suppressing the degradation in the NF for the whole optical fiber amplifier and the decrease of the output power.

Figure 45:
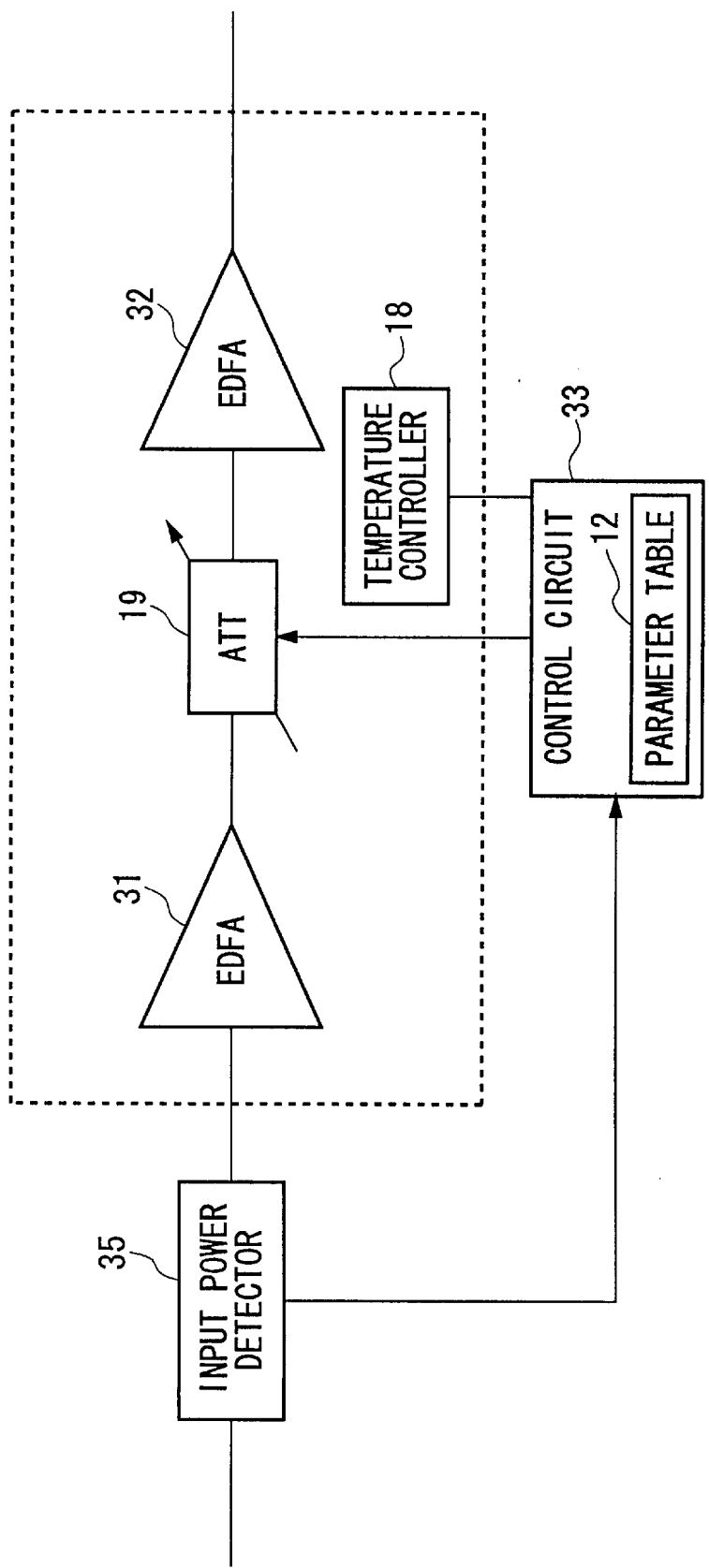
FIG. 45 schematically shows a structure of modification of the tenth embodiment in which the temperature detector 9 is replaced with the temperature controller 18.

Moreover, it is possible to adopt a structure as shown in FIG. 45, using the temperature controller 18 to keep the environmental temperature of the EDF, which constitutes each of the pre-amplifier 31 and the booster-amplifier 32, to be a fixed temperature as in the fourth embodiment, instead of using the temperature detector 9 for measuring the EDF as in the present embodiment. Alternatively, a structure may be adopted in which the environmental temperature of the EDF measured by the temperature controller 18 is cooled or heated so as to coincide with the nearest one of the various environmental temperatures at the interval of 5 degrees included in the matrix of the parameter table.

Embodiment 11

Figure 46:
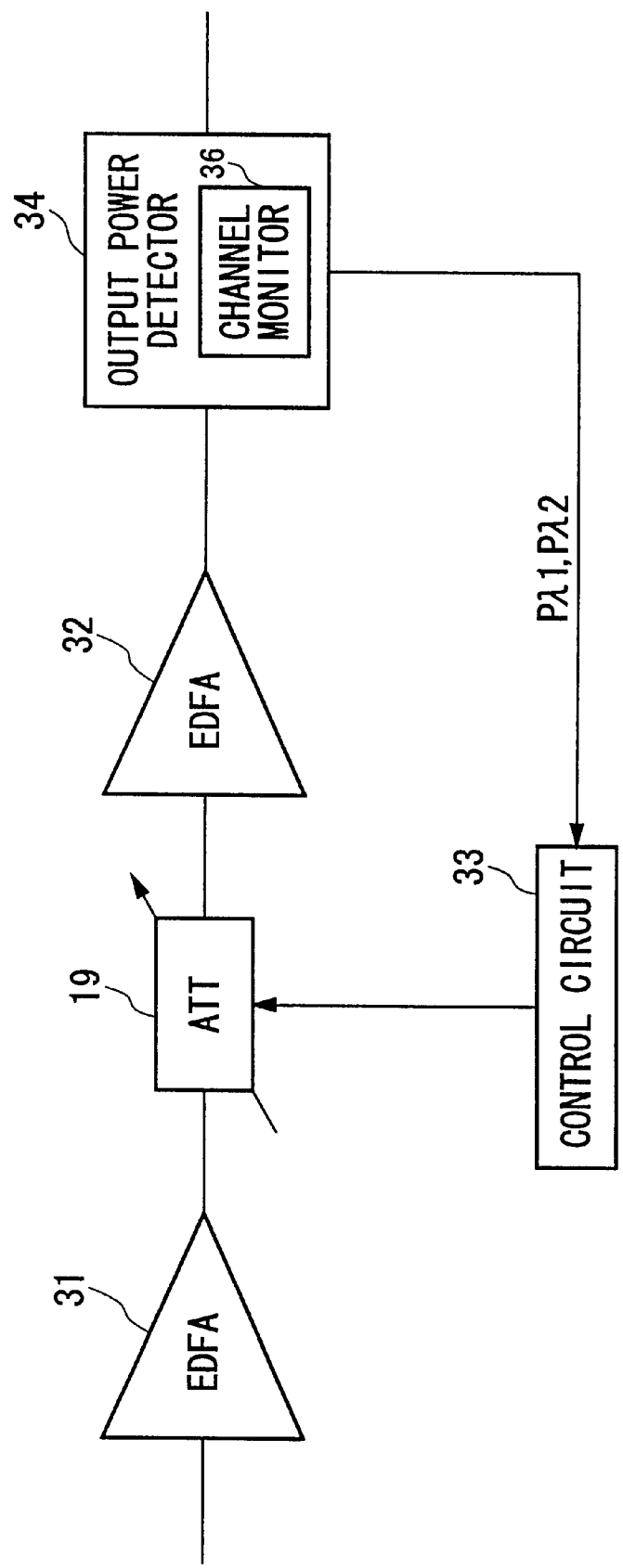
FIG. 46 schematically shows a structure of an optical fiber amplifier according to an eleventh embodiment of the present invention.

FIG. 46 shows a schematic structure of an optical fiber amplifier according to an eleventh embodiment of the present invention. In FIG. 46, parts similar to those in the aforementioned embodiments are shown with the same reference numerals.

The present embodiment is different from the ninth embodiment in the output-light-power detector 34. In the output-light-power detector 34 of the present embodiment, a channel monitor 36 is provided. This enables the direct detection of the gain deviation of the output signal light.

The control circuit 33 does not control the power of the output light to be a fixed value. Instead, it calculates the optimum attenuation amount for reducing the detected gain deviation so as to send out a control signal corresponding to the calculation result to the variable optical attenuator 19.

The optimum attenuation amount is calculated in the following manner.

The channel monitor 36 can measure a specific wavelength and a power at the specific wavelength. Therefore, it can measure the powers of the respective signal light beams, Then, the gain deviation can be obtained by subtracting the lowest power from the highest power.

In the optical fiber amplifier, the tendency of the gain deviation when the power of the input signal light is increased is similar to that obtained when the environmental temperature becomes lower. More specifically, under a condition of a fixed power of the pumping light, the power of the shorter-wavelength output light becomes lower than that of the longer-wavelength output light when the power of the input signal light is increased. Similarly, when the environmental temperature becomes lower, the power of the shorter-wavelength output light becomes lower than that of the longer-wavelength output light.

The above-mentioned type of the gain deviation, in which the power of the shorter-wavelength output signal light becomes lower, can be suppressed by increasing the attenuation amount by the variable optical attenuator 19. On the other hand, the gain deviation in which the power of the shorter-wavelength output signal light becomes higher than that of the longer-wavelength output signal light can be suppressed by decreasing the attenuation amount by the variable optical attenuator 19.

Therefore, assuming that the powers of the shorter-wavelength signal light λ1 and the longer-wavelength signal light λ2 are Pλ1 and Pλ2, respectively, calculation for obtaining (Pλ1−Pλ2) is first performed by using the power of the longer-wavelength signal light as a reference. When the calculated value is a positive value, the attenuation amount is decreased. On the other hand, when the calculated value is a negative value, the attenuation amount is increased. The control method described above is illustrated in FIG. 47.

The amplifying operation in the present embodiment is similar to that in the ninth embodiment. However, it is possible to directly detect the gain deviation according to the present embodiment because the channel monitor 36 is provided. In addition, according to the present embodiment, the attenuation amount by the variable optical attenuator 19 can be controlled by the control circuit 33 so as to suppress the gain deviation, irrespective of the power of the input signal light and the environmental temperature of the EDF that are external factors.

Moreover, the existence of the variable optical attenuator 19 does not cause the degradation of the NF of the whole optical fiber amplifier or the decrease of the output power because the variable optical attenuator 19 is provided at an intermediate point of the two-stage optical fiber amplifier. The power of the output signal light after passing through the booster-amplifier 32 is dominated by the signal light component because the ASE component is so decreased that it can be ignored with respect to the signal light component. Accordingly, the effects of the noise component on the signal light in the detection by the output-light-power detector are reduced compared to those obtained according to the conventional technique, thereby enabling more precise detection of the output power.

Although the optical fiber amplifier incorporating the EDFA is described in each of the ninth through eleventh embodiments, the present invention can be applied to another optical fiber amplifier to which another rare element for providing similar amplification characteristics is added, In addition, it should be noted that the structure described in the ninth through eleventh embodiments are examples. The present invention can be applied to a structure in which a plurality of PDs or channel monitors are included. Also, a structure in which a number of optical fiber amplifiers having the above-mentioned structure are connected may be realized easily.

The power of the whole output light is detected by the output-light-power detector 34 and is then controlled to be a predetermined power in the ninth embodiment. However, in order to perform a more precise control, instead of doing the above, the respective powers of the signal light beams included in the output light should be compared to the predetermined power and then controlled.

However, the optical fiber amplifier according to the ninth embodiment can provide substantially the same gain for the respective beams included in the signal light in a case of the amplifying operation at a predetermined operational condition. In addition, the gain-deviation equalizer 40 supplies the signal light including the beams having the deviation within a predetermined deviation range to this optical fiber amplifier via the transmission path 50. Therefore, the powers of the beams included in the signal light output from the booster-amplifier 32 can be regarded as being substantially the same.

Since there exist the above-mentioned characteristics, the present embodiment adopts the structure for simplifying the arithmetic operation, in which the detected whole output signal power is compared to a predetermined power. In addition, for the similar reasons, in a case of a structure in which the powers of the beams included in the signal light are respectively compared to another predetermined power and then controlled, the power of each beam can be easily obtained by dividing the detected whole output signal power by the number of the beams included in the signal light. Such simplification of the arithmetic operation is performed in the tenth embodiment of the present invention. In this case, a structure may be adopted in which the detected input signal power is divided by the number of the beams included in the signal light so as to generate the control signal based on the value obtained by the division.

Moreover, the invention described in the ninth embodiment can be applied to an optical transmission system in which the number of signals (i.e., the number of channels) is changed. In this case, it is necessary to know how many channels are currently input by means of the output-light-power detector 34 and then to change the power supplied from the pumping light source depending on the number of the channels. For example, it is assumed that the maximum number of the channels is N and the power supplied from the pumping light source when the N channels are input is Pmax. In this case, if k channels are currently input, the power supplied from the pumping light source is changed to Pmaxx(k/N). Then, the detected output signal power is divided by the number of channels, i.e., k and thereafter the power of the signal light for each channel obtained by the division is subjected to comparison with the predetermined power. Similarly, the tenth and eleventh embodiments can be applied to the optical transmission system in which the number of the channels may be changed.

Furthermore, although the ninth through eleventh embodiments can be applied both in the L-band and C-band, each of the embodiments can be modified depending on the characteristics of the type to which it is applied. For example, in the case of applying each of the ninth through eleventh embodiments in the C-band, an equalization filter may be provided before the booster-amplifier. In addition, in the case of applying the tenth embodiment in the C-band, there arises substantially no problem even when the control only using the input signal light as a reference, because the gain deviation depending on the temperature change in the C-band is less than that in the L-band.

As described above, the present invention focuses on the fact that the tendency of the wavelength-dependent output of the amplification by the forward pumping is different from that by the backward pumping in the erbium-doped fiber amplifier which performs amplification in the long wavelength region. Therefore, according to the present invention, the gain deviation can be compensated effectively with a simple structure under various operational conditions by controlling the output power of the pumping light source depending on the change of the gain deviation caused by the power of the input signal light and the environmental temperature of the erbium-doped fiber.

In addition, a decrease in the power of the pumping light is equivalent to an increase in the power of the signal light in an optical fiber amplifier incorporating the EDF or the like. Also, an increase in the power of the pumping light is equivalent to a decrease in the power of the signal light. Therefore, without increasing the power of the pumping light supplied to the optical fiber amplifier, the same effects can be obtained in the control for the optical fiber amplifier by decreasing the power of the input signal light.

For this reason, the optimum operational condition can be maintained by providing a variable optical attenuator at an intermediate point in the optical fiber amplifier of a two-stage structure and by controlling the attenuation amount, allowing the gain deviation to be suppressed with a simple structure while suppressing the decrease in the output power of the optical fiber amplifier.

In the above, the present invention has been described by reference to the preferred embodiments. However, the scope of the present invention is not limited to that of the preferred embodiments. It would be appreciated by a person having ordinary skill in the art that various modifications can be made to the above-described embodiments. Moreover, it is apparent from the appended claims that embodiments with such modifications are also included in the scope of the present invention.

What is claimed is:

1. An optical fiber amplifier comprising:
   an erbium-doped optical fiber to which a multiplexed optical signal into which a plurality of optical signals in a long-wavelength band are multiplexed is supplied and which is operable to perform amplification in the long-wavelength band;
   a forward-pumping light source operable to supply forward-pumping light to said erbium-doped optical fiber;
   a backward-pumping light source operable to supply backward-pumping light to said erbium-doped optical fiber, said backward-pumping light source having an output power which is variable based on a control signal;
   an input-power detector operable to detect an input power of the multiplexed optical signal input to said erbium-doped optical fiber;
   a temperature detector operable to detect a temperature of said erbium-doped optical fiber; and
   a control circuit operable to output the control signal based on the input power detected by said input-power detector and the temperature detected by said temperature detector, the control signal changing the output power of said backward-pumping light source to cancel deviation of the amplification of the multiplexed optical signal.

2. An optical fiber amplifier according to claim 1, wherein said control circuit includes a memory having stored therein a parameter table defining the control signal for a specific value of the input power and a specific value of the temperature.

3. An optical fiber amplifier according to claim 1, wherein the long-wavelength band is a region of 1565 nm or longer.

4. An optical fiber amplifier according to claim 1, wherein said forward-pumping light source has an output power which is variable based on the control signal.

5. An optical fiber amplifier according to claim 1, wherein said input-power detector is operable to detect an input power of a specific one of the plurality of optical signals.

6. An optical fiber amplifier comprising:
   an erbium-doped optical fiber to which a multiplexed optical signal into which a plurality of optical signals in a long-wavelength band are multiplexed is supplied and which is operable to perform amplification in the long-wavelength band;
   a forward-pumping light source operable to supply forward-pumping light to said erbium-doped optical fiber;
   a backward-pumping light source operable to supply backward-pumping light to said erbium-doped optical fiber, said backward-pumping light source having an output power which is variable based on a control signal;

an input-power detector operable to detect an input power of the multiplexed optical signal input to said erbium-doped optical fiber;

a temperature controller operable to keep said erbium-doped optical fiber at a predetermined temperature; and a control circuit operable to output the control signal based on the input power detected by said input-power detector and the predetermined temperature, the control signal changing the output power of said backward-pumping light source to cancel deviation of the amplification of the multiplexed optical signal.

7. An optical fiber amplifier according to claim 6, wherein said control circuit includes a memory having stored therein a parameter table defining the control signal for a specific value of the input power at the predetermined temperature.

8. An optical fiber amplifier according to claim 6, wherein the long-wavelength band is a region of 1565 nm or longer.

9. An optical fiber amplifier according to claim 6, wherein said forward-pumping light source has an output power which is variable based on the control signal.

10. An optical fiber amplifier comprising:

an erbium-doped optical fiber to which a multiplexed optical signal into which a plurality of optical signals in a long-wavelength band are multiplexed is supplied and which is operable to perform amplification of the multiplexed optical signal in the long-wavelength band;

a forward-pumping light source operable to supply forward-pumping light to said erbium-doped optical fiber;

a backward-pumping light source operable to supply backward-pumping light to said erbium-doped optical fiber, said backward-pumping light source having an output power which is variable based on a control signal;

an output-deviation detector operable to detect deviation of the amplified multiplexed optical signal output from said erbium-doped optical fiber;

a control circuit operable to output the control signal changing the output power of said backward-pumping light source to cancel the deviation of the amplified multiplexed optical signal detected by said output-deviation detector.

11. An optical fiber amplifier according to claim 10, wherein the long-wavelength band is a region of 1565 nm or longer.

12. An optical fiber amplifier according to claim 10, wherein said output-deviation detector is operable to detect output powers of two points of output light output from said erbium-doped optical fiber that are included in the long-wavelength band and to calculate the deviation.

13. An optical fiber amplifier according to claim 12, wherein said output-deviation detector is operable to detect output powers of specific ones of the plurality of optical signals and to calculate the deviation.

14. An optical fiber amplifier according to claim 12, wherein said output-deviation detector is operable to detect an amplified spontaneous emission component in the long-wavelength band and to calculate the deviation.

15. An optical fiber amplifier according to claim 10, wherein said forward-pumping light source has an output power which is variable based on the control signal.

16. A method for controlling an optical fiber amplifier including: an erbium-doped optical fiber to which a multiplexed optical signal into which a plurality of optical signals in a long-wavelength band are multiplexed is supplied and which is operable to perform amplification of the multiplexed optical signal in the long-wavelength band; a forward-pumping light source operable to supply forward-pumping light to the erbium-doped optical fiber; and a backward-pumping light source operable to supply backward-pumping light to the erbium-doped optical fiber, the backward-pumping light source having an output power which is variable based on a control signal, said method comprising:

detecting an input power of the multiplexed optical signal input to the erbium-doped optical fiber;

detecting a temperature of the erbium-doped optical fiber; and generating the control signal using a control circuit based on the detected input power and the detected temperature, the control signal changing the output power of the backward-pumping light source to cancel deviation of the amplification of the multiplexed optical signal.

17. A method according to claim 16, wherein the control circuit includes a memory having stored therein a parameter table defining the control signal for a specific value of the input power and a specific value of the temperature.

18. A method according to claim 16, wherein the erbium-doped optical fiber is kept at a predetermined temperature and the control circuit generates the control signal based on the predetermined temperature and the detected input power, the control signal changing the output power of the backward-pumping light source to cancel the deviation of the amplification of the multiplexed optical signal.

19. A method for controlling an optical fiber amplifier including: an erbium-doped optical fiber to which a multiplexed optical signal into which a plurality of optical signals in a long-wavelength band are multiplexed is supplied and which is operable to perform amplification of the multiplexed optical signal in the long-wavelength band; a forward-pumping light source operable to supply forward-pumping light the erbium-doped optical fiber; a backward-pumping light source operable to supply backward-pumping light to the erbium-doped optical fiber, the backward-pumping light source having an output power which is variable based on a control signal, said method comprising:

detecting deviation of the amplified multiplexed optical signal output from the erbium-doped optical fiber;

generating, by using a control circuit, the control signal changing the output power of the backward-pumping light source to cancel the detected deviation of the multiplexed optical signal.

20. A method according to claim 19, wherein output powers of two points of output light output from said erbium-doped optical fiber that are included in the long-wavelength band are detected and the deviation is calculated using the detected output powers.

21. A method according to claim 20, wherein output powers of specific ones of the plurality of optical signals are detected and the deviation is calculated using the detected output power.

22. A method according to claim 20, wherein an amplified spontaneous emission component in the long-wavelength band is detected and the deviation in the multiplexed optical signal is calculated using the detected amplified spontaneous emission component.

23. An optical amplifier comprising:

a stimulated emission medium to which a multiplexed optical signal into which a plurality of optical signals are multiplexed is supplied, said stimulated emission medium having a wavelength-dependent output in a case of forward pumping of which tendency of inclination is different from that in a case of backward pumping;

a forward-pumping light source operable to supply forward-pumping light to said stimulated emission medium;

a backward-pumping light source operable to supply backward-pumping light to said stimulated emission medium, said backward-pumping light source having an output power which is variable based on a control signal;

an input-power detector operable to detect an input power of the multiplexed optical signal input to said stimulated emission medium;

a temperature detector operable to detect a temperature of said stimulated emission medium; and a control circuit operable to output the control signal based on the input power detected by said input power detector and said temperature detected by said temperature detector, the control signal changing the output power of said backward-pumping light source to cancel deviation of amplification of the multiplexed optical signal.

24. An optical fiber transmission system comprising:

a gain-deviation equalizer, disposed upstream in a transmission path, operable to compensate deviation of a plurality of signal light beams to be within a predetermined deviation range; and an optical fiber amplifier disposed downstream in the transmission path, said optical fiber amplifier comprising:

a first optical fiber amplifying portion, to which the plurality of signal light beams are supplied, operable to amplify and output the plurality of signal light beams;

a variable attenuator operable to attenuate and output light output from said first optical fiber amplifing portion based on a control signal;

a second optical fiber amplifying portion operable to amplify and output light output from said variable attenuator;

an input-power detector operable to detect an input power in a wavelength band of the plurality of signal light beams input to said first optical fiber amplifying portion;

a control circuit operable to generate the control signal to make a gain deviation of said first and second optical fiber amplifying portions to be suppressed based on the detected input power; and a temperature detector operable to detect temperatures of said first and second optical fiber amplifying portions;

wherein said control circuit generates the control signal to make the gain deviation of said first and second optical fiber amplifying portions to be suppressed based on the detected input power and the detected temperature.

25. An optical fiber amplifier comprising:

a first optical fiber amplifying portion, to which a plurality of signal light beams having deviation within a predetermined deviation range are supplied, operable to amplify and output the plurality of signal light beams;

a variable attenuator operable to attenuate and output light output from said first optical fiber amplifying portion based on a control signal;

a second optical fiber amplifying portion operable to amplify and output light output from said variable attenuator;

an output-power detector operable to detect an output power in a wavelength region of the plurality of signal light beams output from said second optical fiber amplifying portion; and a control circuit operable to generate the control signal to set the detected output power to be a predetermined value at which gain deviation of said first and second optical fiber amplifying portions is suppressed;

wherein said control circuit generates the control signal by dividing the detected output power by a number of the plurality of signal light beams to obtain a value and comparing the obtained value to the predetermined value.

26. An optical fiber amplifier according to claim 25, wherein said control circuit generates the control signal which increases an attenuation amount by said variable attenuator when the detected output power is larger than the predetermined value and which decreases the attenuation amount by said variable attenuator when the detected output power is smaller than the predetermined value.

27. An optical fiber amplifier according to claim 25, wherein a range of the attenuation amount by said variable attenuator is the same as an input power dynamic range of said first optical fiber amplifying portion.

28. An optical fiber amplifier comprising:

a first optical fiber amplifying portion, to which a plurality of signal light beams are supplied, operable to amplify and output the plurality of signal light beams;

a variable attenuator operable to attenuate and output light output from said first optical fiber amplifying portion based on a control signal;

a second optical fiber amplifying portion operable to amplify and output light output from said variable attenuator;

an output-power detector operable to detect output powers of first and second ones of the plurality of signal light beams output from said first and second optical fiber amplifing portions, the first signal light beam having a shorter wavelength while the second signal light beam having a longer wavelength; and a control circuit operable to obtain a gain deviation by comparing the detected output powers of the first and second ones of the plurality of signal light beams and to generate a control signal to make the gain deviation to be suppressed.

29. An optical fiber amplifier according to claim 28, wherein said control circuit is operable to decrease an attenuation amount by said variable attenuator when the output power of the first signal light beam is higher than the output power of the second signal light beam while increasing the attenuation amount when the output power of the second signal light beam is higher than the output power of the first signal light beam.

30. An optical fiber amplifier according to claim 28, wherein a range of the attenuation amount by said variable attenuator is the same as an input power dynamic range of said first optical fiber amplifying portion.

31. An optical fiber amplifier comprising:

a first optical fiber amplifying portion, to which a plurality of signal light beams having deviation within a predetermined deviation region are supplied, operable to amplify and output the plurality of signal light beams;

a variable attenuator operable to attenuate and output light output from said first optical fiber amplifying portion based on a control signal;

a second optical fiber amplifying portion operable to amplify and output light output from said variable attenuator;

an input-power detector operable to detect an input power in a wavelength band of the plurality of signal light beams input to said first optical fiber amplifying portion;

a control circuit operable to generate the control signal to make gain deviation of said first and second optical fiber amplifying portions to be suppressed based on the detected input power; and a temperature detector operable to detect temperatures of said first and second optical fiber amplifying portions;

wherein said control circuit generates the control signal to make a gain deviation of said first and second optical fiber amplifying portions to be suppressed based on the detected input power and the detected temperatures.

32. An optical fiber amplifier comprising:

a first optical fiber amplifying portion, to which a plurality of signal light beams having deviation within a predetermined deviation region are supplied, operable to amplify and output the plurality of signal light beams;

a variable attenuator operable to attenuate and output light output from said first optical fiber amplifying portion based on a control signal;

a second optical fiber amplifying portion operable to amplify and output light output from said variable attenuator;

an input-power detector operable to detect an input power in a wavelength band of the plurality of signal light beams input to said first optical fiber amplifying portion; and a control circuit operable to generate the control signal to make gain deviation of said first and second optical fiber amplifying portions to be suppressed based on the detected input power;

wherein said control circuit includes a memory having stored therein a parameter table which defines the control signal corresponding to a specific value of the input power and a specific value of the temperature.

33. An optical fiber amplifier comprising:

a first optical fiber amplifying portion, to which a plurality of signal light beams having deviation within a predetermined deviation region are supplied, operable to amplify and output the plurality of signal light beams;

a variable attenuator operable to attenuate and output light output from said first optical fiber amplifying portion based on a control signal;

a second optical fiber amplifying portion operable to amplify and output light output from said variable attenuator;

an input-power detector operable to detect an input power in a wavelength band of the plurality of signal light beams input to said first optical fiber amplifying portion; and a control circuit operable to generate the control signal to make gain deviation of said first and second optical fiber amplifying portions to be suppressed based on the detected input power;

wherein said control circuit decreases an attenuation amount by said variable attenuator when the temperature becomes higher and increases the attenuation amount when the temperature becomes lower.

34. An optical fiber amplifier comprising:

a first optical fiber amplifing portion, to which a plurality of signal light beams having deviation within a predetermined deviation region are supplied, operable to amplify and output the plurality of signal light beams;

a variable attenuator operable to attenuate and output light output from said first optical fiber amplifying portion based on a control signal;

a second optical fiber amplifying portion operable to amplify and output light output from said variable attenuator;

an input-power detector operable to detect an input power in a wavelength band of the plurality of signal light beams input to said first optical fiber amplifying portion;

a control circuit operable to generate the control signal to make gain deviation of said first and second optical fiber amplifying portions to be suppressed based on the detected input power; and a temperature controller operable to keep said first and second optical fiber amplifying portions at a predetermined temperature.

35. An optical fiber amplifier comprising:

a first optical fiber amplifying portion, to which a plurality of signal light beams having deviation within a predetermined deviation region are supplied, operable to amplify and output the plurality of signal light beams;

a variable attenuator operable to attenuate and output light output from said first optical fiber amplifying portion based on a control signal;

a second optical fiber amplifying portion operable to amplify and output light output from said variable attenuator;

an input-power detector operable to detect an input power in a wavelength band of the plurality of signal light beams input to said first optical fiber amplifying portion; and a control circuit operable to generate the control signal to make gain deviation of said first and second optical fiber amplifying portions to be suppressed based on the detected input power;

wherein said control circuit generates the control signal based on a value obtained by dividing the detected input power by a number of the plurality of signal light beams.

* * * * *